(12) United States Patent
Penangwala et al.

(10) Patent No.: US 9,747,297 B2
(45) Date of Patent: Aug. 29, 2017

(54) SYNCHRONIZATION OF SHARED FOLDERS AND FILES

(71) Applicant: Amazon Technologies, Inc., Seattle, WA (US)

(72) Inventors: Amaan Ahmed Penangwala, Mountain View, CA (US); Scott Anthony Plant, San Jose, CA (US); Richa Sehgal, San Mateo, CA (US); Kevin Gillett, Menlo Park, CA (US); Borislav Andruschuk, Mountain View, CA (US); Stephen Joseph Oakley, Mountain View, CA (US); Arun Ponniah Sethuramalingam, Milpitas, CA (US); Noah Eisner, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 14/494,143

(22) Filed: Sep. 23, 2014

(65) Prior Publication Data
US 2016/0085769 A1  Mar. 24, 2016

(51) Int. Cl.
*G06F 17/30* (2006.01)

(52) U.S. Cl.
CPC .............................. *G06F 17/30174* (2013.01)

(58) Field of Classification Search
CPC ......... G06F 17/30174; G06F 17/30144; G06F 17/30176; G06F 17/30179; G06F 17/30097
USPC ....... 707/610, 620, 625, 656, 758, 747, 812; 715/751; 709/248
See application file for complete search history.

(56) References Cited

U.S. PATENT DOCUMENTS

| | | | |
|---|---|---|---|
| 7,647,329 B1 | 1/2010 | Fischman et al. | |
| 8,650,156 B1 | 2/2014 | McHugh et al. | |
| 2009/0089337 A1* | 4/2009 | Perlin | G06F 17/30144 |
| 2009/0138808 A1* | 5/2009 | Moromisato | G06Q 10/10 |
| | | | 715/758 |
| 2009/0313259 A1* | 12/2009 | Ivanovic | G06F 17/30165 |
| 2011/0173460 A1 | 7/2011 | Ito et al. | |
| 2011/0196900 A1 | 8/2011 | Drobychev et al. | |
| 2013/0091097 A1 | 4/2013 | Chung | |

(Continued)

OTHER PUBLICATIONS

PCT Search Report and Written Opinion mailed Dec. 14, 2015 for PCT Application No. PCT/US15/51398, 10 pages.

*Primary Examiner* — Greta Robinson
(74) *Attorney, Agent, or Firm* — Lee & Hayes, PLLC

(57) ABSTRACT

A method of synchronizing shared folders and files within a remote and local file system includes determining a remote and local file system state. The remote file system state includes remote hash values for remote instances of shared folders, shared sub-folders, shared files, shared sub-level files, and shared shortcuts. The local file system state includes a local hash values for local instances of shared folders, shared sub-folders, shared files, shared sub-level files, and shared shortcuts. The method also includes comparing the remote file system state and the local file system state to determine any differences in the hash values within the remote file system state and the local file system state and synchronizing any shared folder, shared sub-folder, or shared file having a differing value in the remote file system state and the local file system state across the local file system and the remote file system.

20 Claims, 9 Drawing Sheets

(56) References Cited

U.S. PATENT DOCUMENTS

| | | | | |
|---|---|---|---|---|
| 2014/0074783 A1* | 3/2014 | Alsina | G06Q 10/10 | 707/624 |
| 2014/0143446 A1* | 5/2014 | Jacobson | H04L 67/1095 | 709/248 |
| 2014/0379647 A1* | 12/2014 | Smith | G06F 17/30174 | 707/624 |
| 2015/0339113 A1* | 11/2015 | Dorman | H04L 63/123 | 717/169 |

* cited by examiner

SYNCHRONIZATION OF SHARED FOLDERS AND FILES

BACKGROUND

As cloud computing has increased, the ability for users to back-up files and folders within a remote memory associated with a remote computer or an array of remote computers has increased dramatically. In certain situations, access to the files and folders within the remote memory may be granted to additional users via other computing devices. Accordingly, files and folders may be shared across multiple users and user devices via the remote memory.

Moreover, an individual user may download a copy of a particular file that is stored remotely, edit the particular file, and upload the edited file to the remote memory. The edited file may then be shared with multiple users via their particular computing devices.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
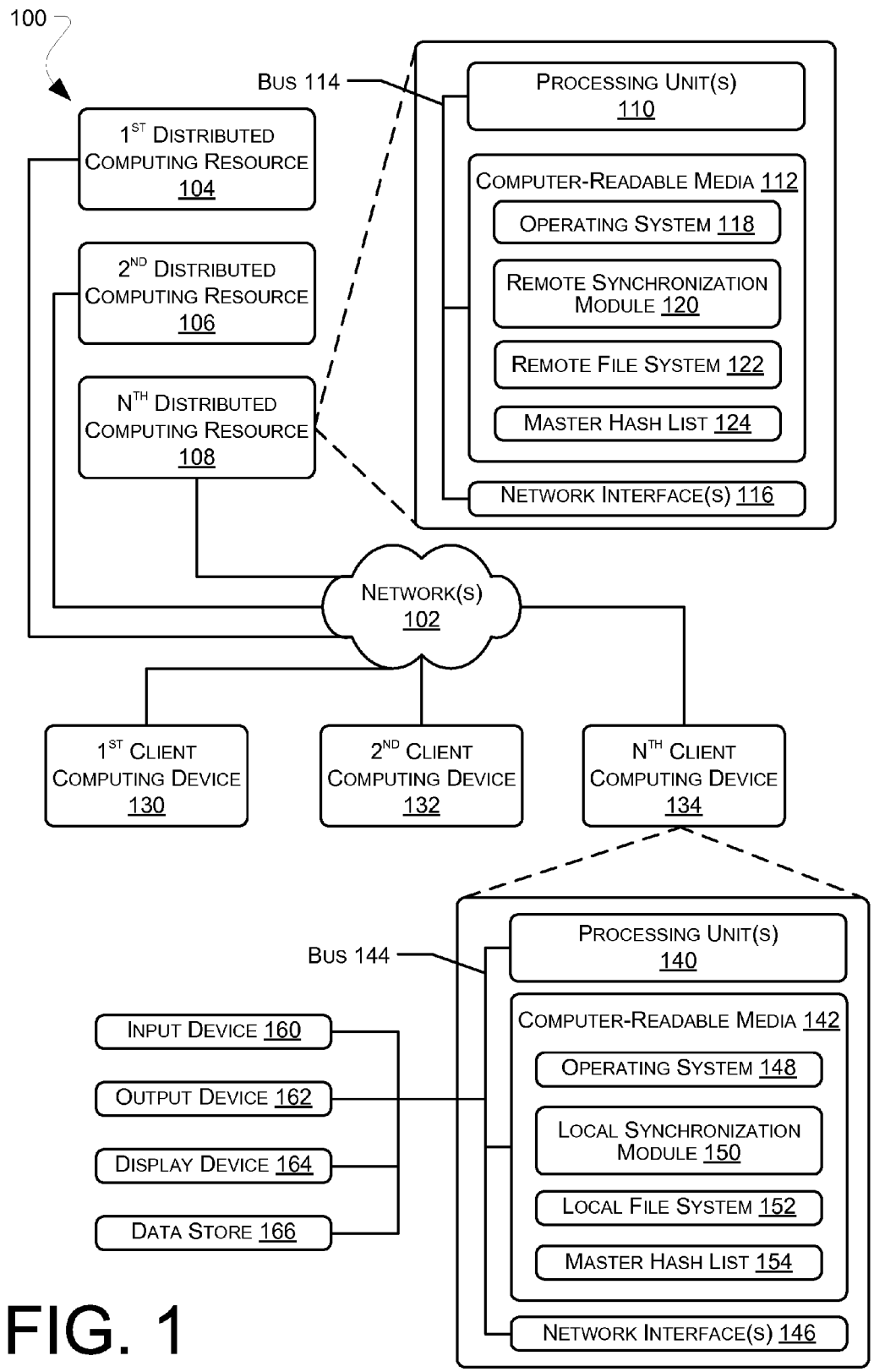
FIG. 1 illustrates a system for synchronizing shared folders and files.

Described herein are systems and processes to synchronize shared folders and files between a remote file system and a number of local file systems. In a particular aspect, the present shared folder and file synchronization system is a state-based system that can determine a current state of one or more local file systems and a current state of a remote file system. Thereafter, the current state of each local file system can be compared to the current state of the remote file system to determine whether differences exist. If differences exist, the shared folder and file synchronization system can determine the changes in content that may be necessary at the particular local file system, the remote file system, or both, in order for each of those file systems to include the same content and to be replicas of each other. Some embodiments of the disclosed technologies can be used in, for example, a document collaboration environment.

The local file system and the remote file system can include content stored in particular shared data structures. The shared data structures can include shared folders, shared sub-folders, shared files, shared sub-level files, shared shortcuts, or a combination thereof. Each shared folder can include a local instance of the shared folder and a remote instance of the shared folder which should be substantially the same and include the same content after synchronization is performed. Each shared sub-folder can include a local instance of the shared sub-folder and a remote instance of the shared sub-folder which should be substantially the same and include the same content after synchronization is performed. Further, each shared file can include a local instance of the shared file and a remote instance of the shared file which should be substantially the same and include the same content, or data, after synchronization is performed. Further, each shared sub-level file can include a local instance of the shared sub-level file and a remote instance of the shared sub-level file which should be substantially the same and include the same content, or data, after synchronization is performed. Finally, Further, each shared shortcut can include a local instance of the shared shortcut and a remote instance of the shared shortcut which should be substantially the same and include the same content, or data, after synchronization is performed.

The shared folder and file synchronization system may utilize a local synchronization module installed locally at each user, or client, computing device and a remote synchronization module at a remote, or distributed, computing resource. The local synchronization modules and the remote synchronization modules can communicate with each other in order to exchange information regarding the state of each local file system and the remote file system in order to keep file edits throughout the shared folders and files up-to-date and synchronized among each of the local file systems and the remote file system.

In one aspect, instead of monitoring the actual content stored within the particular shared folders and shared sub-folders in order to determine whether a particular shared file, or content therein, has been updated, edited, deleted, or otherwise changed, the system can monitor an attribute associated with each shared folder, shared sub-folder, shared file, shared sub-level file, and shared shortcut. The attribute may be a unique identifier associated with a particular folder, a particular sub-folder, a particular file, a particular sub-level file, or a particular shortcut. The attribute can be recomputed and recorded to a master list as the contents of particular files, sub-level files, and shortcuts stored within the folders and sub-folders are altered.

In general, a method for synchronizing shared folders, shared sub-folders, shared files, shared sub-level files, and shared shortcuts can include can include determining a remote file system state and determining a local file system state. Further, the method can include comparing the remote file system state and the local file system state to determine whether a remote instance of a shared folder, a remote instance of shared sub-folder, a remote instance of a shared file, a remote instance of a shared sub-level file, or a remote instance of a shared shortcut includes a remote file system attribute that is different from a local file system attribute of a corresponding local instance of the shared folder, a corresponding local instance of a share sub-folder, a corresponding local instance of a shared file, a corresponding instance of a local shared sub-level file, or a corresponding instance of a local shared shortcut. The shared folder, the shared sub-folder, the shared file, the shared sub-level file, or the shared shortcut in which the remote file system attribute is different from the local file system attribute can be synchronized, e.g., as described in greater detail below.

In a particular aspect, the remote file system attribute can include a remote folder value assigned to the remote instance of the shared folder, a remote sub-folder value assigned to the remote instance of the shared sub-folder, a remote file value assigned to the remote instance of the shared file, a remote file value assigned to the remote instance of the shared sub-level file, or a remote file value assigned to the remote instance of the shared shortcut. More particularly, the remote folder value can include a remote folder hash, the remote sub-folder value can include a remote sub-folder hash, the remote file value can include a remote file hash, the remote sub-level file value can include a remote sub-level file hash, and the remote shortcut value can include a remote shortcut hash. The remote folder hash, the remote sub-folder hash, the remote file hash, the remote sub-level file hash, and the remote shortcut hash can be determined based on a remote hash table for the remote file system.

In another aspect, the local file system attribute can include a local folder value assigned to the local instance of the shared folder, a local sub-folder value assigned to the local instance of the shared sub-folder, a local file value assigned to the local instance of the shared file, a local sub-level file value assigned to the local instance of the shared sub-level file, or a local shortcut value assigned to the local instance of the shared shortcut. Further, the local folder value can include a local folder hash, the local sub-folder value can include a local sub-folder hash, the local file value can include a local file hash, the local sub-level file value can include a local sub-level file hash, and the local shortcut value can include a local shortcut hash. The local folder hash, the local sub-folder hash, the local file hash, the local sub-level file hash, and the local shortcut hash can be determined based on a local hash table for the local file system.

For example, certain data management systems can utilize a hash table or hash map in order to keep track of where particular files are stored within a memory. Each hash provides a location of a particular file within a memory. A folder can include a folder hash. A sub-folder can include a sub-folder hash. Moreover, a file can include a file hash. A sub-level file can include a sub-level file hash and a shortcut can include a shortcut hash.

The sub-folder hash may be a function of the file hashes associated with the files stored in the sub-folder, the sub-level file hashes associated with any sub-level files stored within the sub-folder, and shortcut file hashes associated with any shortcuts stored within the sub-folder. The folder hash may be a function of the sub-folder hashes associated with the sub-folders therein, the file hashes associated with the files within the sub-folder, the sub-level file hashes of the sub-level files (if any) within the sub-folder, the shortcut file hashes of the shortcuts (if any) within the sub-folder, and the file hashes associated with the files within the folder. Any changes to a file hash, a sub-level file hash, and/or a shortcut hash changes the sub-folder hash assigned to the sub-folder, in which the file, sub-level file, and/or shortcut is stored. In turn, the folder hash assigned to the folder in which the sub-folder is changes in response to the new sub-folder hashes.

Accordingly, by monitoring the state of the hashes computed and assigned to each folder, sub-folder, file, sub-level file, and/or shortcut the shared folder and file synchronization system can quickly ascertain which folders, sub-folders, files, sub-level files, shortcuts, or a combination thereof has seen changes to data therein without actually having to monitor the contents of the folders, sub-folders, files, sub-level files, and/or shortcuts. For example, a synchronization module, e.g., a local synchronization module, a remote synchronization module, or a combination thereof, can compare a current list of hashes to a most recent list of hashes for a particular file system.

The synchronization module may quickly traverse the current folder hashes to determine which folder hashes, if any, are different from the most recently recorded folder hash for each folder. Any folder hashes that are different provide an indication to the synchronization module that at least one file, at least one sub-level file, or at least one shortcut within the folder or at least one file, at least one sub-level file, or at least one short cut within a sub-folder of the folder has been altered, e.g., updated, edited, deleted, created, etc. For any folder with a folder hash that is different from the folder hash on the master hash list, the synchronization module may traverse the file hashes, sub-level file hashes, or shortcut hashes associated with the files, sub-level files, and shortcuts stored within the folder to determine which of the files, sub-level files, and/or shortcuts, have been altered.

Moreover, for each folder with a new, or different, folder hash, the synchronization module may traverse the sub-folder hashes associated with the sub-folders within the folder to determine which sub-folders, if any, include files, sub-level files, and/or shortcuts that have been altered. Thereafter, for any sub-folder with a different, sub-folder hash, the synchronization module may traverse the file hashes, sub-level file hashes, and/or shortcut hashes associated with the files, sub-level file hashes, and shortcuts stored within the sub-folder in order to determine which files, sub-level files, and/or shortcuts within the sub-folder have different hashes. Any file, sub-level file, and/or shortcut that includes a different hash is considered to have been altered and that particular file, sub-level file, and/or shortcut is synchronized to include the most recent action. Actions can include updates, edits, additions, deletions, or any other changes to a file or the content of a file.

One or more examples described herein provide processes for synchronizing shared folders and files across multiple local file systems and one or more remote file systems. In various instances, a processing unit, or units, may be configured via programming from modules or APIs to perform the techniques, or processes, as described herein. The processing unit, or units, may include one or more of a GPU, a field-programmable gate array (FPGA), another class of digital signal processor (DSP), or other hardware logic components that may, in some instances, be driven by the CPU. For example, and without limitation, illustrative types of hardware logic components that may be used include Application-Specific Integrated Circuits (ASICs), Application-Specific Standard Products (ASSPs), System-on-a-chip systems (SOCs), Complex Programmable Logic Devices (CPLDs), etc.

In general, a shared folder and file synchronization system can include one or more local computer-readable media having thereon a local synchronization module and a local file system and one or more remote computer-readable media having thereon a remote synchronization module and a remote file system. Further, the shared folder and file synchronization system can include a processing unit that is operably coupled to the local computer-readable media, the remote computer-readable media, or a combination thereof. The processing unit can be adapted to execute the local synchronization module, the remote synchronization module, or a combination thereof.

Further, the local synchronization module, the remote synchronization module, or a combination thereof can be configured to determine a remote file system attribute associated with a remote instance of a shared data structure within the remote file system and to determine a local file system attribute associated with a local instance of a shared data structure within the local file system. The local synchronization module, the remote synchronization module, or a combination thereof can also be configured to determine whether the remote file system attribute is different from the local file system attribute and to selectively synchronizing the remote instance of the shared data structure within the remote file system with the local instance of the shared data structure within the local file system so content within the shared data structure is the same at the remote file system and the local file system.

As described above, the shared data structure can include a shared folder, a shared sub-folder, a shared file, a shared sub-level file, a shared shortcut, or a combination thereof. The remote file system attribute can include a remote folder hash, a remote sub-folder hash, a remote file hash, a remote sub-level file hash, or a remote shortcut hash retrieved from a remote hash table associated with the remote file system. Moreover, the local file system attribute can include a local folder hash, a local sub-folder hash, a local file hash, a local sub-level file hash, or a local shortcut hash retrieved from a local hash table associated with the local file system.

Referring now to FIG. 1, a detailed example of a shared folder and file synchronization system is illustrated and is generally designated 100. As depicted, the shared folder and file synchronization system 100 can include at least one network 102. For example, the network 102 may include public networks such as the Internet, private networks such as an institutional and/or personal intranet, or some combination of private and public networks. The network 102 may also include any type of wired network, wireless network, or a combination thereof. Further, the wireless network may include, for example, a satellite network, a cellular network (e.g., 3G, 4G, etc.), a Wi-Fi network, a WiMax network, another wireless network, or a combination thereof. Moreover, the wired network may include an Ethernet connected via Cat-5 cable, twisted pair telephone lines, coaxial cable, fiber optic cable, or a combination thereof. In another implementation, the network 102 may be a wide area network (WAN), a local area network (LAN), or a combination thereof. Further, the network 102 may include a plain-old telephone service (POTS) network.

The network 102 may utilize communications protocols, including packet-based and/or datagram-based protocols such as internet protocol (IP), transmission control protocol (TCP), user datagram protocol (UDP), or other types of protocols. Moreover, the network 102 may also include a number of devices that facilitate network communications and/or form a hardware basis for the networks, such as switches, routers, gateways, access points, firewalls, base stations, repeaters, backbone devices, and the like.

In some examples, the network 102 may further include one or more devices that enable connection to a wireless network, such as a wireless access point (WAP). Additional examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

As further illustrated in FIG. 1, the shared folder and file synchronization system 100 can also include a first distributed computing resource 104, a second distributed resource 106, and an Nth distributed resource 108 connected to the network 102. In various examples, the distributed computing resources 104, 106, 108 may include one or more computing devices that operate in a cluster or other grouped configuration to share resources, balance load, increase performance, provide fail-over support or redundancy, or for other purposes. The distributed computing resources 104, 106, 108 may also include computing devices that may belong to a variety of categories or classes of devices such as traditional server-type devices, desktop computer-type devices, mobile-type devices, special purpose-type devices, embedded-type devices, and/or wearable-type devices.

Thus, the distributed computing resources 104, 106, 108 may include a diverse variety of device types and are not limited to a particular type of device. The distributed computing resources 104, 106, 108 may represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

FIG. 1 further illustrates the details regarding the Nth distributed computing resource 108. It can be appreciated that the first distributed computing resource 104 and the second distributed computing resource 106 may be configured in substantially the same manner as the Nth distributed computing resource 108 and can include all or a combination of any of the components described herein in conjunction with the Nth distributed computing resource 108.

As shown, the Nth distributed computing resource 108 may be any computing device and the Nth distributed computing resource 108 can include one or more processing units 110 operably, or electrically, connected to computer-readable media 112, e.g., via a bus 114. The bus 114 may include one or more of a system bus, a data bus, an address bus, a PCI bus, a Mini-PCI bus, and any variety of local, peripheral, and/or independent buses.

The Nth distributed computing resource 108 may also include one or more network interfaces 116 to enable communications between the Nth distributed computing resource 108 and other computing resources or devices via the network 102. The network interface 116 may include one or more network interface controllers (NICs) or other types of transceiver devices to send and receive communications over a network. In a particular aspect, as illustrated in FIG. 1, executable instructions can be stored on the computer-readable media 112 and those instructions may include, for example, an operating system 118, a remote shared folder and file synchronization module 120, and other modules, programs, or applications that are loadable and executable by the one or more processing units 110.

Alternatively, or in addition, the functionality described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may represent a hybrid device, such as one from ZYLEX or ALTERA that includes a CPU core embedded in an FPGA fabric.

The computer-readable media 112 of the Nth distributed computing resource 108 may also include, or be partitioned with, a remote file system 122 in which a plurality of folders, sub-folders, files, or a combination thereof may be stored. The plurality of folders, sub-folders, and files can include a plurality of shared folders, shared sub-folders, shared files, shared sub-level files, and shared shortcuts. More particularly, the plurality of shared folders, shared sub-folders, shared files, shared sub-level files, and shared shortcuts can include a plurality of remote instances of shared folders, a plurality of remote instances of shared sub-folders, and a plurality of remote instances of shared files.

Figure 2:
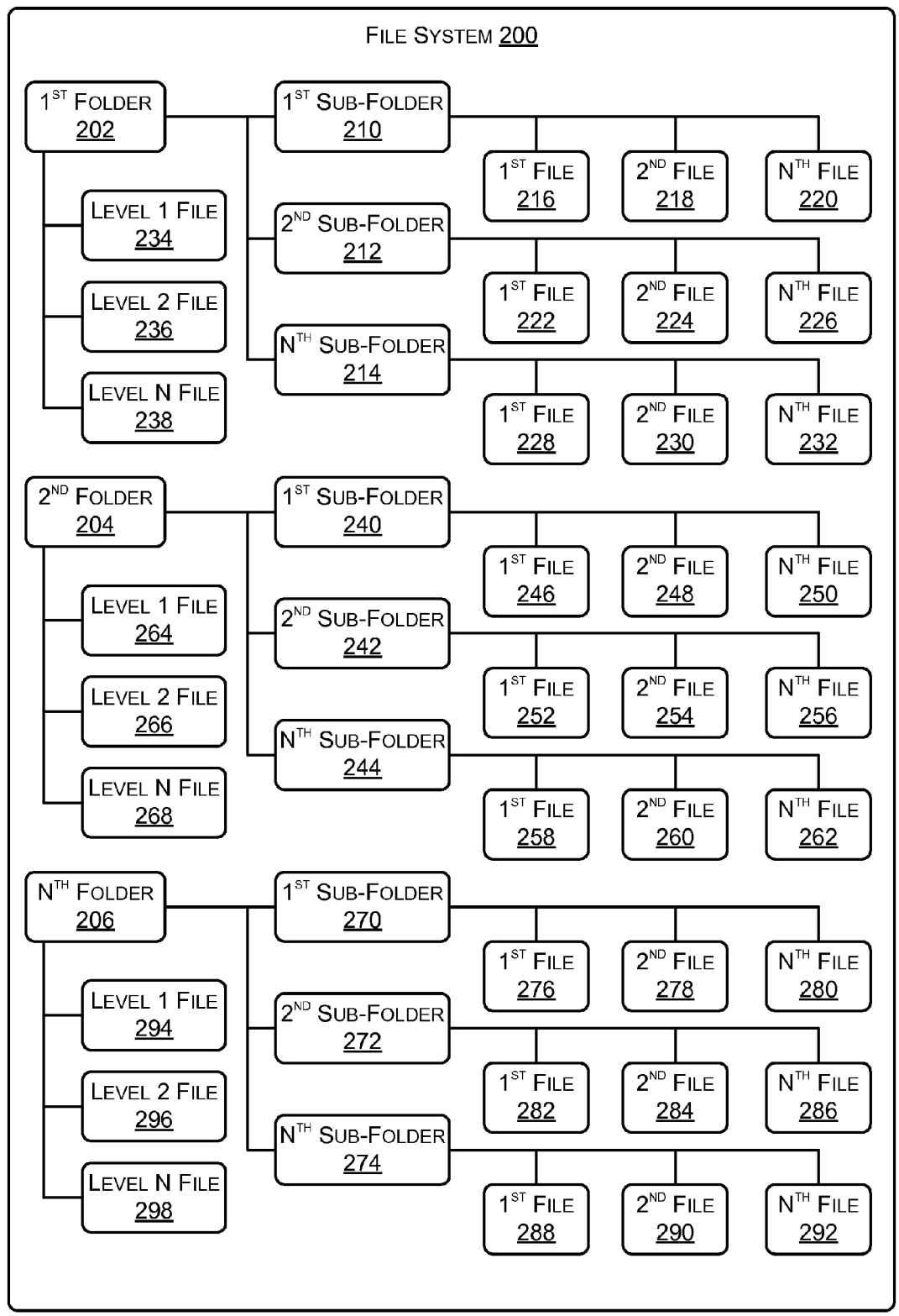
FIG. 2 illustrates an example file system.
Figure 3:
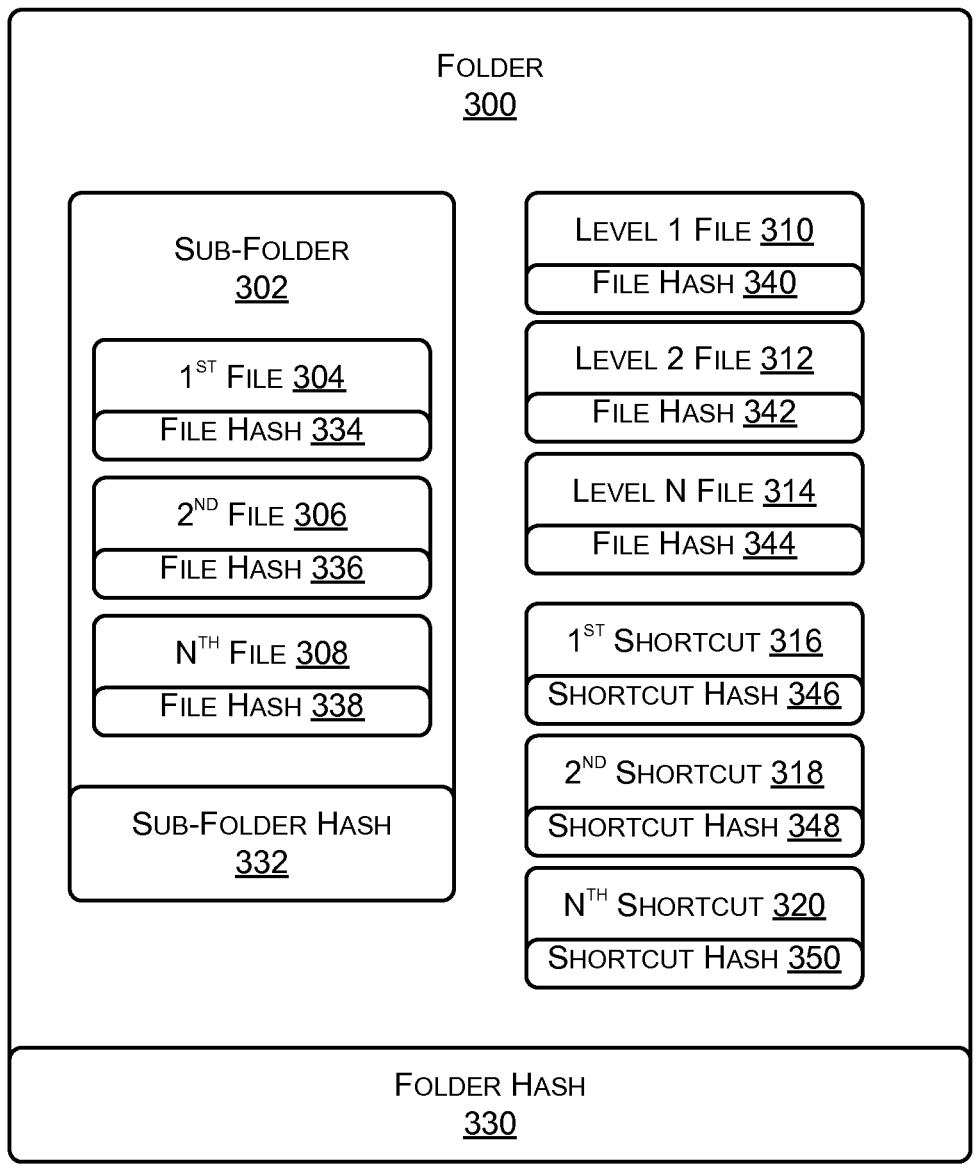
FIG. 3 illustrates an example folder.

In particular, the remote file system 122 may utilize a cryptographic hash function, or other hash function, to store and retrieve files and data stored within the remote file system 122. The hash function may include a derivative of the Merkle-Damgård hash function such as MD2, MD4, MD5, MD6, SHA-0, SHA-1, SHA-2, SHA-3, or a combination thereof. In another aspect, the hash function may include a race integrity primitives evaluation message digest (RIPEMD) hash function, RIPEMD-160, or a combination thereof. FIG. 2 and FIG. 3, described below, provide greater detail regarding an example file system and an example folder that may be found within the remote file system 122.

FIG. 1 further indicates that the computer-readable media 112 can include a master hash list 124 stored thereon. The master hash list 124, as described herein, can include a list of folder hashes, sub-folder hashes, and file hashes and may be used to compare a current state of folder hashes, sub-folder hashes, and file hashes thereto in order to determine if the content within the folders, sub-folders, and/or files has changed since the last master hash list was computed and recorded.

For simplicity, other components or features that may be typically associated, or included, with a computing device such as the Nth distributed computing resource 108 are omitted from the depiction of the Nth distributed computing resource 108 in FIG. 1. These other components or features may include, but are not limited to, an A/C power supply, a D/C power supply, various connector ports, various cords, various LED indicators, speakers, a housing, a chassis, fans, heat sinks, input devices, output devices, display devices, etc.

FIG. 1 further indicates that the shared folder and file synchronization system 100 can include a first client computing device 130, a second client computing device 132, and an Nth client computing device 134. The client computing devices 130, 132, 134 may belong to a variety of categories or classes of devices, which may be the same as or different from the distributed computing resources 104, 106, 108. These categories or classes of devices may include traditional client-type devices, desktop computer-type devices, mobile-type devices, special purpose-type devices, embedded-type devices, and/or wearable-type devices. Further, the client computing devices 130, 132, 134 may include a diverse variety of device types and are not limited to any particular type of device.

For example, the client computing devices 130, 132, 134 may also include, but are not limited to, computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

Moreover, an entity, such as a user, may be associated with each, or any, of the client computing devices 130, 132, 134. The entity may include a particular user and one or more designees of the user such as an assistant of the user, a supervisor of the user, a spouse of the user, a parent of the user, and/or another entity to whom the user grants permission to access the client computing device 130, 132, 134.

FIG. 1 further illustrates the details regarding the Nth client computing device 134. It can be appreciated that the first client computing device 130 and the second client computing device 132 may be configured in the same manner as the Nth client computing device 134 and may include all or a combination of any of the components described herein in conjunction with the Nth client computing device 134.

As depicted, the Nth client computing device 134 may be any computing device and the Nth client computing device 134 can include one or more processing units 140 operably, or electrically, connected to computer-readable media 142, e.g., via a bus 144. The bus 144 may include one or more of a system bus, a data bus, an address bus, a PCI bus, a Mini-PCI bus, and any variety of local, peripheral, and/or independent buses.

The Nth client computing device 134 may also include one or more network interfaces 146 to enable communications between the Nth client computing device 134 and other computing resources or devices via the network 102. The network interface 146 may include one or more network interface controllers (NICs) or other types of transceiver devices to send and receive communications over a network. In a particular aspect, executable instructions can be stored on the computer-readable media 142 of the Nth client computing device 134 and those instructions, as illustrated in FIG. 1, may include, for example, an operating system 148, a local shared folder and file synchronization module 150, and other modules, programs, or applications that are loadable and executable by the one or more processing units 140.

Alternatively, or in addition, the functionally described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may represent a hybrid device, such as one from ZYLEX or ALTERA that includes a CPU course embedded in an FPGA fabric.

The computer-readable media 142 of the Nth client computing device 134 may also include, or be partitioned with, a local file system 152 in which a plurality of folders, sub-folders, files, or a combination thereof may be stored. The plurality of folders, sub-folders, and files can include a plurality of shared folders, shared sub-folders, shared files, shared sub-level files, and shared shortcuts. More particularly, the plurality of shared folders, shared sub-folders, shared files, shared sub-level files, and shared shortcuts can include a plurality of local instances of shared folders, a plurality of local instances of shared sub-folders, and a plurality of local instances of shared files.

In a particular aspect, the local file system 152 may utilize a cryptographic hash function, or other hash function, to store and retrieve files and data stored within the local file system 152. The hash function may include a derivative of the Merkle-Damgård hash function such as MD2, MD4, MD5, MD6, SHA-0, SHA-1, SHA-2, SHA-3, or a combination thereof. In another aspect, the hash function may include a race integrity primitives evaluation message digest (RIPEMD) hash function, RIPEMD-160, or a combination thereof. FIG. 2 and FIG. 3, described below, provide greater detail regarding an example file system and an example folder that may be found within the local file system 152.

As further illustrated in FIG. 1, the computer-readable media 142 can include a master hash list 154 stored thereon. The master hash list 154, as described herein, can include a list of folder hashes, sub-folder hashes, and file hashes and may be used to compare a current state of folder hashes, sub-folder hashes, and file hashes thereto in order to determine if the content within the folders, sub-folders, and/or files has changed since the last master hash list was computed and recorded.

The master hash list 154 can be a copy of the master hash list 124 stored within the Nth distributed computing resource 108. At times, the master hash lists 124, 154 can be identical. However, as folders, sub-folders, files, or a combination thereof are altered at the various client computing devices 130, 132, 134, the master hash lists 124, 154 may be different before being synchronized with each other.

Still referring to FIG. 1, the Nth client computing device 134 can also include an input device 160, an output device 162, a display device 164, or a combination thereof connected thereto. In particular, the input device 160, the output device 162, and the display device 164 can be connected to the bus 144. The input device 160, the output device 162, and the display device 164 may provide a user with the ability to communicate with the Nth client computing device 134. The input device 160 may include a mouse, a keyboard, a microphone, a touch screen, a joystick, a hand held controller, a light pen, a track ball, a scanner, a graphic tablet, magnetic ink card reader (MICR), an optical character reader (OCR), a bar code reader, an optical mark reader, or a combination thereof. The output device 162 may include a printer, a speaker, a haptic device, or a combination thereof. The display device 164 may include a screen, a monitor, a projector, or a combination thereof.

FIG. 1 further indicates that the shared folder and file synchronization system 100 can include a data store 166 connected to the Nth client computing device 134. It can be appreciated that in an alternative aspect, the shared folder and file local synchronization module 150, the local file system 152, the master hash list 154, or a combination thereof may be located within the data store 166. In various aspects and examples, the data store 166 includes data storage such as a database, data warehouse, or other type of structured or unstructured data storage. In some examples, the data store 166 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

Computer-readable media may include computer storage media and/or communication media. Computer storage media may include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 112, 142 may be examples of computer storage media similar to data store 166.

Thus, the computer-readable media 112, 142 and/or data store 166 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), mask read-only memory (MROM), programmable read-only memory (PROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that may be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

For simplicity, other components or features that may be typically associated, or included, with a computing device such as the Nth client computing device 134 are omitted from the depiction of the Nth client computing device 134 in FIG. 1. These other components or features may include, but are not limited to, an A/C power supply, a D/C power supply, various connector ports, various cords, various LED indicators, a housing, a chassis, fans, heat sinks, etc.

The computer-readable storage media 112, 142 and/or data store 166 may be used to store any number of functional components that are executable by the one or more processing units 110, 140. In many implementations, these functional components comprise instructions or programs that are executable by the one or more processing units 110, 140 and that, when executed, implement operational logic for performing the operations attributed to the shared folder and file synchronization system 100. Functional components of the shared folder and file synchronization system 100 that may be executed on the one or more processing units 110, 140 for implementing the various functions and features related to synchronizing shared folders and files, as described herein, include the remote shared folder and file synchronization module 120 within the Nth distributed computing resource 108 and the local shared folder and file synchronization module 150 within the Nth client computing device 134.

In an implementation, the various modules 120, 150 may include computer-readable instructions that are executable by the processing units 110, 140 to perform operations related to the synchronization of shared folders and files among several client computing devices 130, 132, 134 and at least one distributed computing resource 104, 106, 108.

Referring now to FIG. 2, an example of a file system is shown and is generally designated 200. The file system 200 illustrated in FIG. 2 may be used as the remote file system 122 (FIG. 1) within the Nth distributed computing resource 108 (FIG. 1). Further, the file system 200 shown in FIG. 2 may be used at the local file system 152 (FIG. 1) within the Nth client computing device 134 (FIG. 1). In another aspect, the file system 200 can be located within the data store 166 (FIG. 1) coupled to the Nth client computing device 134 (FIG. 1).

As illustrated in FIG. 2, the file system 200 can include a first folder 202, a second folder 204, and an Nth folder 206. Each folder 202, 204, 206 can include a name, identifier, or other descriptor, e.g., my documents, photos, music, work, etc. Further, as indicated in FIG. 2, the first folder 202 can include a first sub-folder 210, a second sub-folder 212, and an Nth sub-folder 214. Each sub-folder 210, 212, 214 can include a name, identifier, or some other descriptor.

The first sub-folder 210 within the first folder 202 can include a first file 216, a second file 218, and an Nth file 220. The second sub-folder 212 within the first folder 202 can include a first file 222, a second file 224, and an Nth file 226. Moreover, the third sub-folder 214 within the first folder 202 can include a first file 228, a second file 230, and an Nth file 232.

Each file 216-232 can include an archive file, a compressed file, a computer-aided design file, a database file, a desktop publishing file, a document file, a financial record file, a font file, a geographic information system file, a graphics file, a link file, a shortcut file, a mathematical file, an object code file, a page description language file, a personal information manager file, a presentation file, a project management software file, a reference management software file, a scientific data file, a security file, a signal data (non-audio) file, a sound (audio) file, a source code file, a spreadsheet file, a tabulated data file, a video file, a video game file, a virtual machine file, a webpage file, some other file, or a combination thereof.

As illustrated in FIG. 2, the first folder 202 within the file system 200 can also include a sub-level one (1) file 234 (aka, a first sub-level file), a sub-level two (2) file 236 (aka, a second sub-level file), and a sub-level N file 238 (aka, an Nth sub-level file).

The second folder 204 can include a first sub-folder 240, a second sub-folder 242, and an Nth sub-folder 244. Each sub-folder 240, 242, 244 can include a name, identifier, or some other descriptor. The first sub-folder 240 within the second folder 204 can include a first file 246, a second file 248, and an Nth file 250. The second sub-folder 242 within the second folder 204 can include a first file 252, a second file 254, and an Nth file 256. Moreover, the third sub-folder 244 within the second folder 204 can include a first file 258, a second file 260, and an Nth file 262.

Each file 246-262 can include an archive file, a compressed file, a computer-aided design file, a database file, a desktop publishing file, a document file, a financial record file, a font file, a geographic information system file, a graphics file, a link file, a shortcut file, a mathematical file, an object code file, a page description language file, a personal information manager file, a presentation file, a project management software file, a reference management software file, a scientific data file, a security file, a signal data (non-audio) file, a sound (audio) file, a source code file, a spreadsheet file, a tabulated data file, a video file, a video game file, a virtual machine file, a webpage file, some other file, or a combination thereof.

As indicated in FIG. 2, the second folder 204 within the file system 200 can also include a sub-level one (1) file 264 (aka, a first sub-level file), a sub-level two (2) file 266 (aka, a second sub-level file), and a sub-level N file 268 (aka, an Nth sub-level file).

Moreover, as illustrated, the third folder 206 can include a first sub-folder 270, a second sub-folder 272, and an Nth sub-folder 274. Each sub-folder 270, 272, 274 can include a name, identifier, or some other descriptor. The first sub-folder 270 within the third folder 206 can include a first file 276, a second file 278, and an Nth file 280. The second sub-folder 272 within the third folder 206 can include a first file 282, a second file 284, and an Nth file 286. Moreover, the third sub-folder 274 within the third folder 206 can include a first file 288, a second file 290, and an Nth file 292.

Each file 276-292 can include an archive file, a compressed file, a computer-aided design file, a database file, a desktop publishing file, a document file, a financial record file, a font file, a geographic information system file, a graphics file, a link file, a shortcut file, a mathematical file, an object code file, a page description language file, a personal information manager file, a presentation file, a project management software file, a reference management software file, a scientific data file, a security file, a signal data (non-audio) file, a sound (audio) file, a source code file, a spreadsheet file, a tabulated data file, a video file, a video game file, a virtual machine file, a webpage file, some other file, or a combination thereof.

FIG. 2 also shows that the Nth folder 206 within the file system 200 can include a sub-level one (1) file 294 (aka, a first sub-level file), a sub-level two (2) file 296 (aka, a second sub-level file), and a sub-level N file 298 (aka, an Nth sub-level file).

FIG. 3 illustrates an example of a folder, designated 300. The folder 300 can be used with the file systems 122, 152 described in conjunction with FIG. 1 and the file system 200 described in conjunction with FIG. 2. Further, the folder 300 can be a representation of any of the folders 202, 204, 206 illustrated in FIG. 2.

As depicted in FIG. 3, the folder 300 can include a sub-folder 302 and the sub-folder 302 can include a first file 304, a second file 306, and an Nth file 308. The folder 300 can also include a sub-level 1 file 310 (aka, a first sub-level file), a sub-level 2 file 312 (aka, a second sub-level file), and a sub-level N file 314 (aka, an Nth sub-level file). Each file 304-312 can include an archive file, a compressed file, a computer-aided design file, a database file, a desktop publishing file, a document file, a financial record file, a font file, a geographic information system file, a graphics file, a link file, a shortcut file, a mathematical file, an object code file, a page description language file, a personal information manager file, a presentation file, a project management software file, a reference management software file, a scientific data file, a security file, a signal data (non-audio) file, a sound (audio) file, a source code file, a spreadsheet file, a tabulated data file, a video file, a video game file, a virtual machine file, a webpage file, some other file, or a combination thereof.

FIG. 3 also illustrates that the folder 300 can include a first shortcut 316, a second shortcut 318, and an Nth shortcut 320. Each shortcut 316, 318, 320 can be a symbolic link, i.e., a symlink or a soft link. Further, each shortcut 316, 318, 320 can include a reference to another file or directory in the form of an absolute or relative path.

As indicated in FIG. 3, the folder 300 can include a folder hash 330 and the folder hash 330 can be an indication of where the folder 300 is stored within a file system of a computer readable medium. The sub-folder 302 can include a sub-folder hash 332 which can be an indication of where the sub-folder 302 is stored within a file system of a computer readable medium. Further, each file 304, 306, 308 within the sub-folder 302 can include a corresponding file hash 334, 336, 338. For example, the first file 304 can include a first file hash 334, the second file 306 can include a second file hash 336, and the Nth file 308 can include an Nth file hash 338. Each file hash 334, 336, 338 can indicate where each file 304, 306, 308 is stored within a file system of a computer readable medium.

FIG. 3 further illustrates that the sub-level 1 file 310 can include an associated file hash 340, the sub-level 2 file 312 can include an associated file hash 342, and the sub-level N file 314 can also include a file hash 344. Each file hash 340, 342, 344 can indicate where each file 310, 312, 314 is stored within a file system of a computer readable medium. The first shortcut 316 can include a shortcut hash 346, the second shortcut 318 can include a shortcut hash 348, and the Nth shortcut 320 can also include a shortcut hash 350. Each shortcut hash 346, 348, 350 can indicate where each shortcut 316, 318, 320 is stored within a file system of a computer readable medium.

In a particular example, the sub-folder hash 332 may be a function of the file hashes 334, 336, 338 associated with the files 304, 306, 308 stored in the sub-folder 302. In other words, the sub-folder hash 332 may be computed based on the file hashes 334, 336, 338 associated with the files 304, 306, 308 that are stored within the sub-folder 302. Any changes to any of the files hashes 334, 336, 338 will result in a new sub-folder hash 332.

The folder hash 330 may be a function of the sub-folder hash 332 associated with the sub-folder 302 stored within the folder, the file hashes 334, 336, 338 associated with the files 304, 306, 308 stored within the sub-folder 302, the sub-level file hashes 340, 342, 344 associated with the sub-level files 310, 312, 314 stored within the folder 300, and the shortcut hashes 346, 348, 350 associated with the shortcuts 316, 318, 320 stored within the folder 300. In other words, the folder hash 330 may be computed based on the sub-folder hash 332 associated with the sub-folder 302 stored within the folder, the file hashes 334, 336, 338 associated with the files 304, 306, 308 stored within the sub-folder 302, the sub-level file hashes 340, 342, 344 associated with the sub-level files 310, 312, 314 stored within the folder 300, and the shortcut hashes 346, 348, 350 associated with the shortcuts 316, 318, 320 stored within the folder 300. Accordingly, any changes to any of the sub-folder hash 332, the file hashes 334, 336, 338, the sub-level file hashes 340, 342, 344, and the shortcut hashes 346, 348, 350 will result in a new folder hash 330.

Accordingly, by monitoring the state of the hashes 330-350, computed and assigned to each folder 300, the sub-folder 302, the files 304, 306, 308, the sub-level files 310, 312, 314, and the shortcuts 316, 318, 320, the shared folder and file synchronization system 100 (FIG. 1), e.g., the remote and local shared folder and file synchronization modules 120, 150 (FIG. 1), can quickly ascertain which folders 202-206, 300, sub-folders 210-214, 240-244, 270-274, 302, files 216-232, 246-262, 276-288, 304-308, sub-level files 234-238, 264-268, 294-298, 310-314, shortcuts 316-320, or a combination thereof have been altered, or have undergone changes to data therein, without actually having to monitor the contents of the folders 202-206, 300, sub-folders 210-214, 240-244, 270-274, 302, files 216-232, 246-262, 276-288, 304-308, sub-level files 234-238, 264-268, 294-298, 310-314, and shortcuts 316-320.

For example, the remote shared folder and file synchronization module 120, 150 may compare a current list of hashes 330-350 for the remote or local file system 122, 152 to a most recent list of hashes, e.g., a master hash list 124, 154 for that particular remote or local file system 122, 152 in order to determine which folders 202-206, 300, sub-folders 210-214, 240-244, 270-274, 302, files 216-232, 246-262, 276-288, 304-308, sub-level files 234-238, 264-268, 294-298, 310-314, and shortcuts 316-320 may need to be synchronized. If none of the hashes 330-350 have changed, no synchronization will be performed for the remote or local file system 122, 152.

The remote or local shared folder and file synchronization module 120, 150 may quickly traverse the current folder hashes 330 to determine which of the folder hashes 330, if any, are different from the most recently recorded folder hash 330 for each folder 202-206, 300. Any folder hashes 330 that are different provide an indication to the remote or local shared folder and file synchronization module 120, 150 that a file 216-232, 246-262, 276-288, 304-308 within a sub-folder 210-214, 240-244, 270-274, 302 of the folder 202-206, 300 has been altered, e.g., updated, edited, deleted, created, etc. For any folder 202-206, 300 with a folder hash 330 that is different from the folder hash 330 on the master list 124, 154, the remote or local synchronization module 120, 150 may traverse the file hashes 334-338 associated with the files 216-232, 246-262, 276-288, 304-308 stored within the folders 202-206, 300 to determine which of the files 216-232, 246-262, 276-288, 304-308, if any, have been altered. Further, the sub-level file hashes 340-344 may be traversed in order to determine which of the sub-level files 234-238, 264-268, 294-298, 310-314 have been altered, updated, or otherwise changed. Also, the shortcut hashes 346-350 may be traversed in order to determine if any of the shortcuts 316-320 have been altered or changed.

Moreover, for each folder 202-206, 300 with a new, or different, folder hash 330, the remote or local shared folder and file synchronization module 120, 150 may traverse the sub-folder hashes 332 associated with the sub-folders 210-214, 240-244, 270-274, 302 within the folders 202-206, 300 to determine which sub-folders 210-214, 240-244, 270-274, 302, if any, include files 216-232, 246-262, 276-292, 304-308 that have been altered. Thereafter, for any sub-folder 210-214, 240-244, 270-274, 310 with a different, sub-folder hash 332, the remote or local synchronization module 120, 150 may traverse the file hashes 334-338 associated with the files 216-232, 246-262, 276-292, 304-308 stored within the sub-folder 210-214, 240-244, 270-274, 310 in order to determine which files 216-232, 246-262, 276-292, 304-308 have different file hashes 334-338.

Any file 216-232, 246-262, 276-292, 304-308 that includes a different file hash 334-338 is considered to have been altered and that particular file 216-232, 246-262, 276-292, 304-308 is synchronized to include the most recent action. Actions can include updates, edits, additions, deletions, or any other changes to a file 220-236, 250-266, 280-296, 304-308 or the content of a file 220-236, 250-266, 280-296, 304-308.

Figure 4:
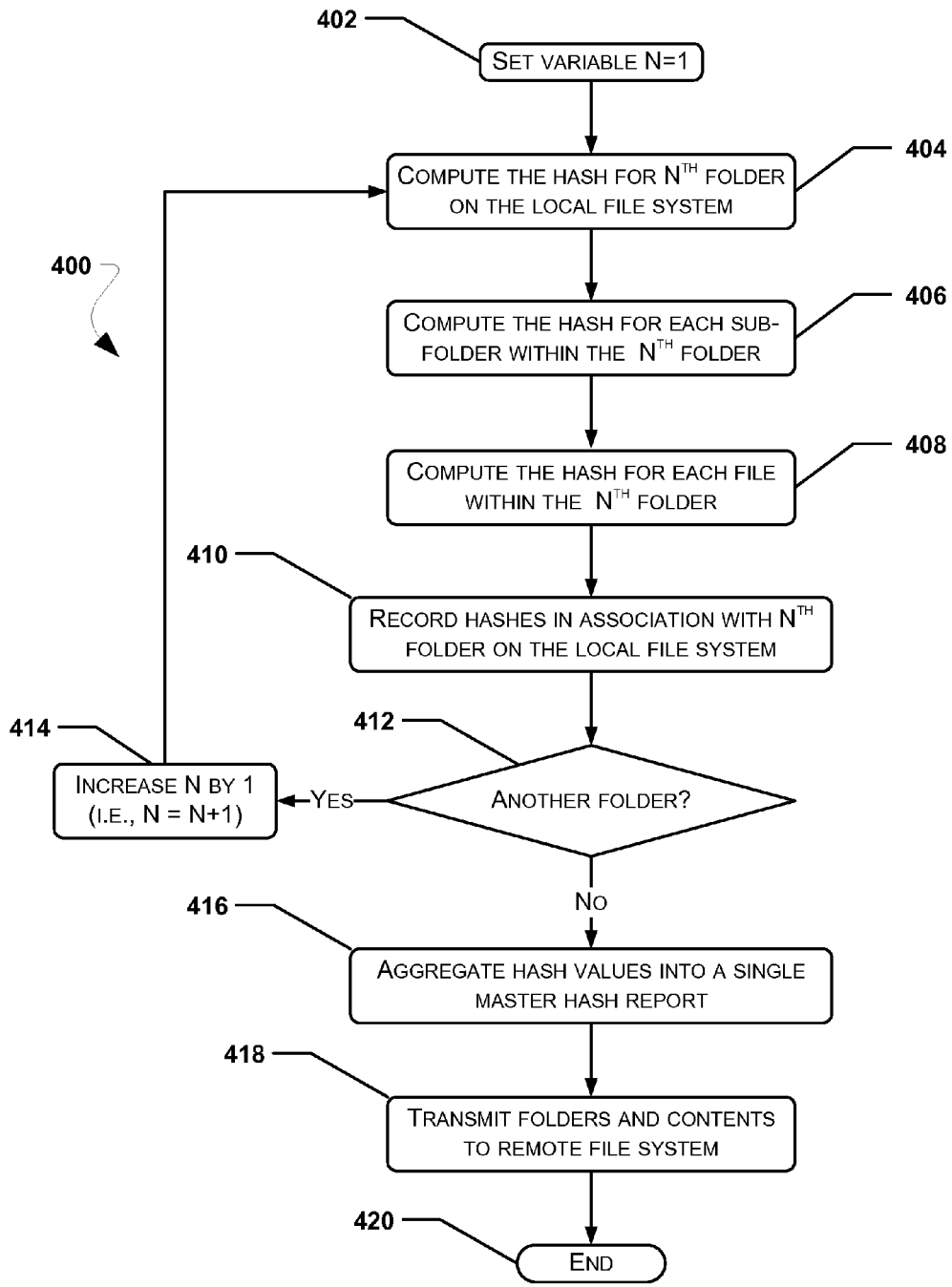
FIG. 4 illustrates a flow diagram of an example process to upload files and a master hash list to a remote file system.
Figure 5:
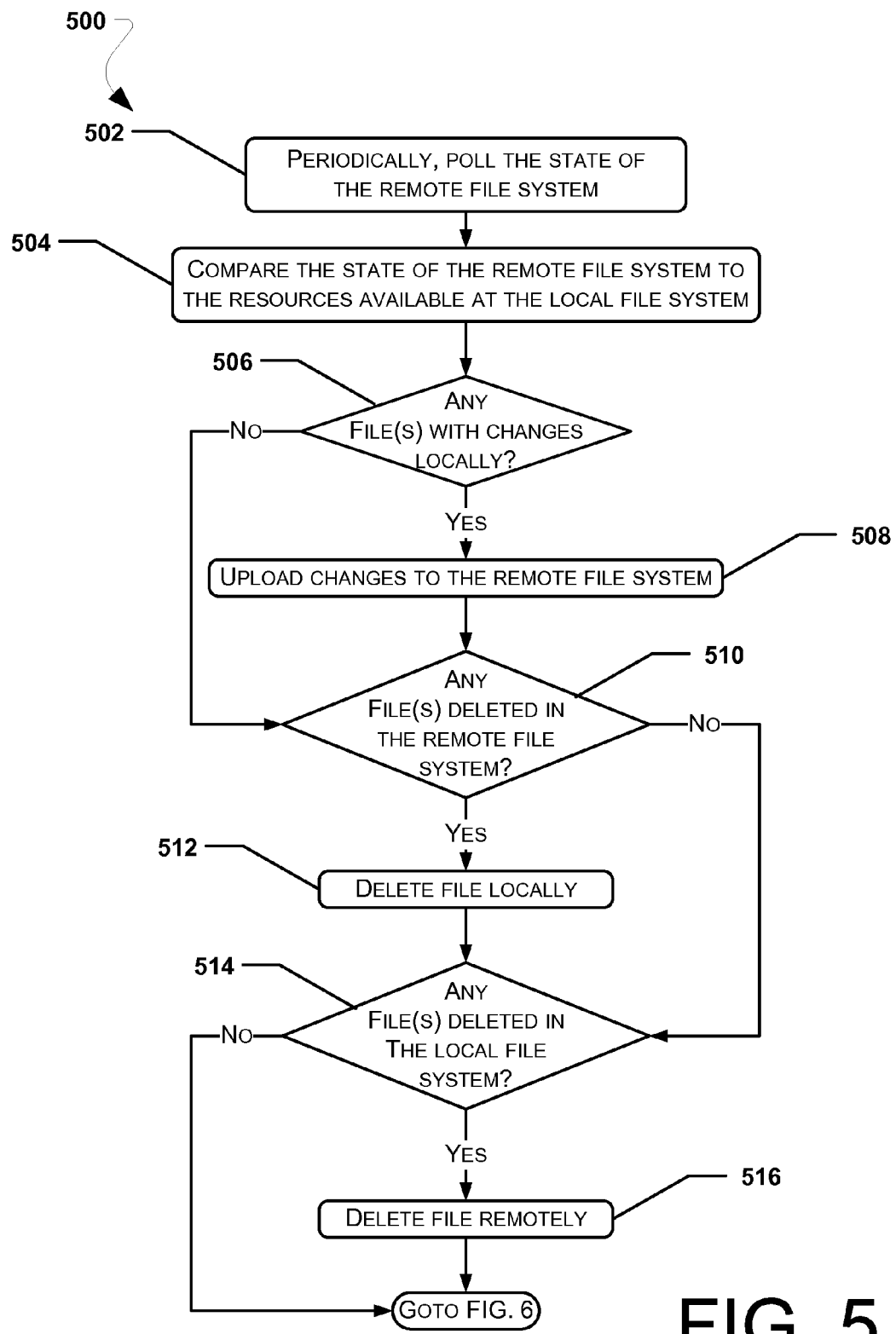
FIG. 5 illustrates a first portion of a flow diagram of an example process for synchronizing shared folders and files.
Figure 6:
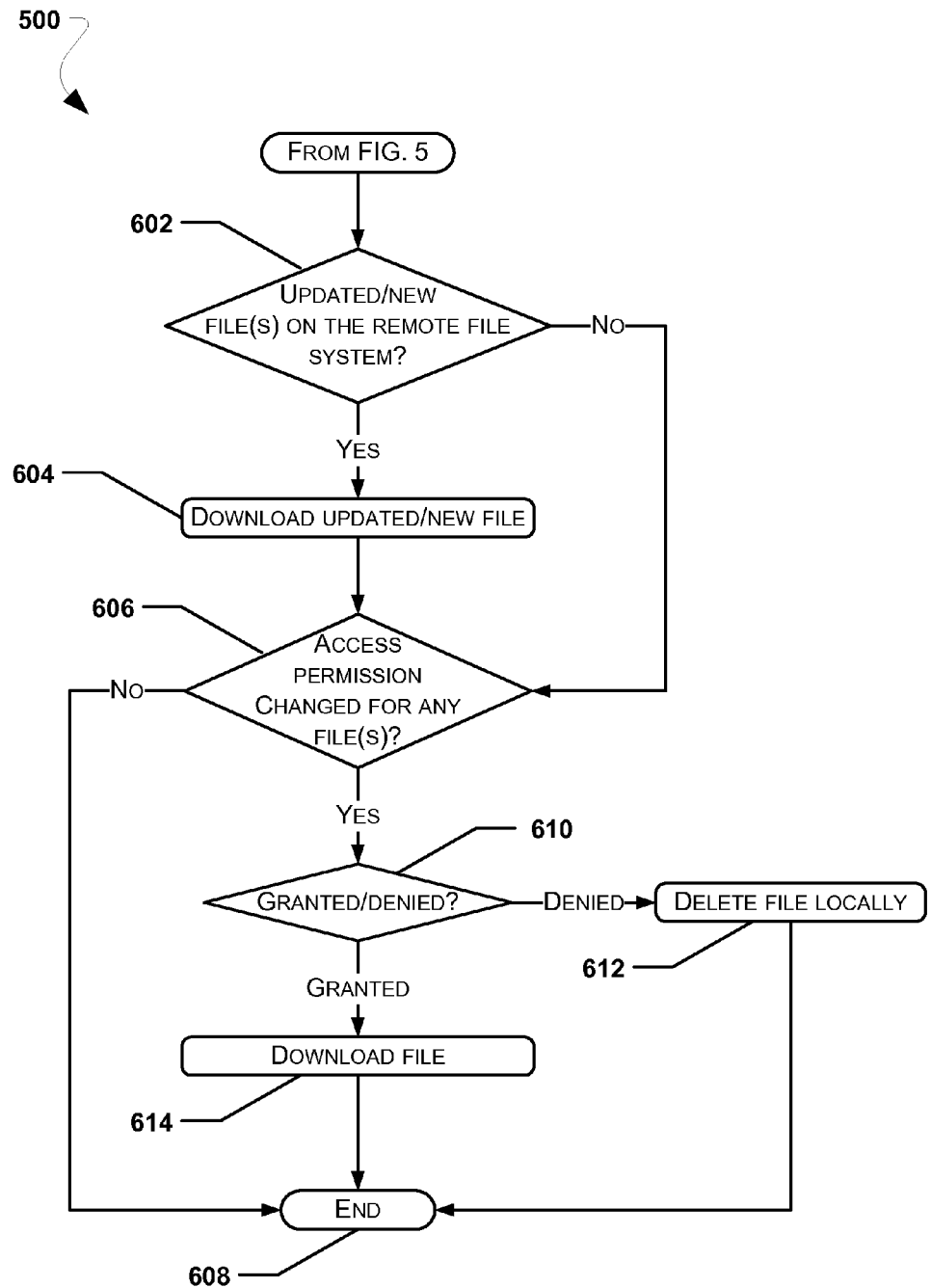
FIG. 6 illustrates a second portion of a flow diagram of an example process for synchronizing shared folders and files.

FIGS. 4 through 9 illustrate various processes associated with the synchronization of shared folders and files. FIG. 4, for example, illustrates a flow diagram of an example process to upload files and a master hash list to a remote file system. FIG. 5 and FIG. 6 illustrate a flow diagram of an example process for synchronizing shared folders and files.

Figure 7:
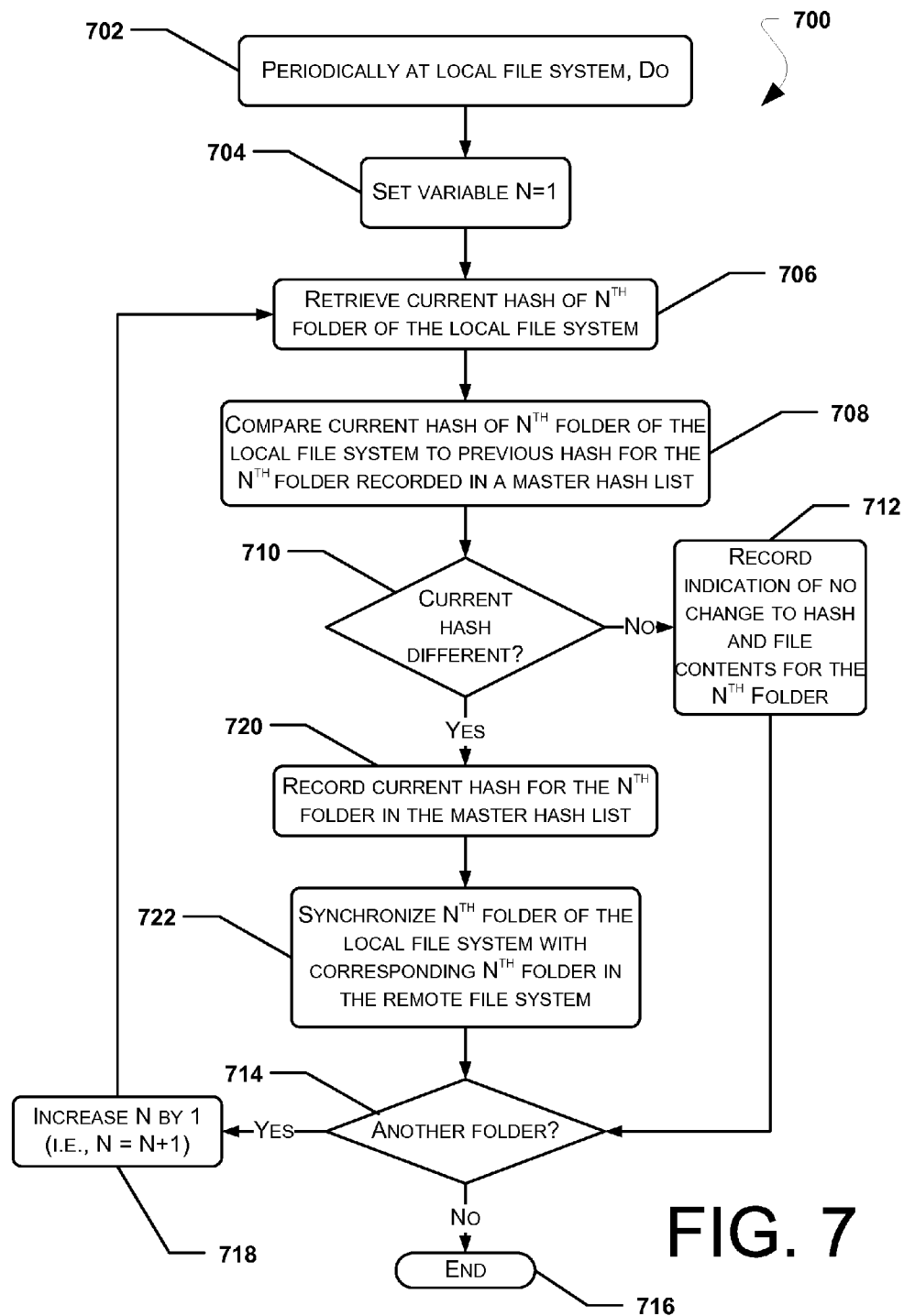
FIG. 7 illustrates a flow diagram of an example process for synchronizing files from a local file system.
Figure 8:
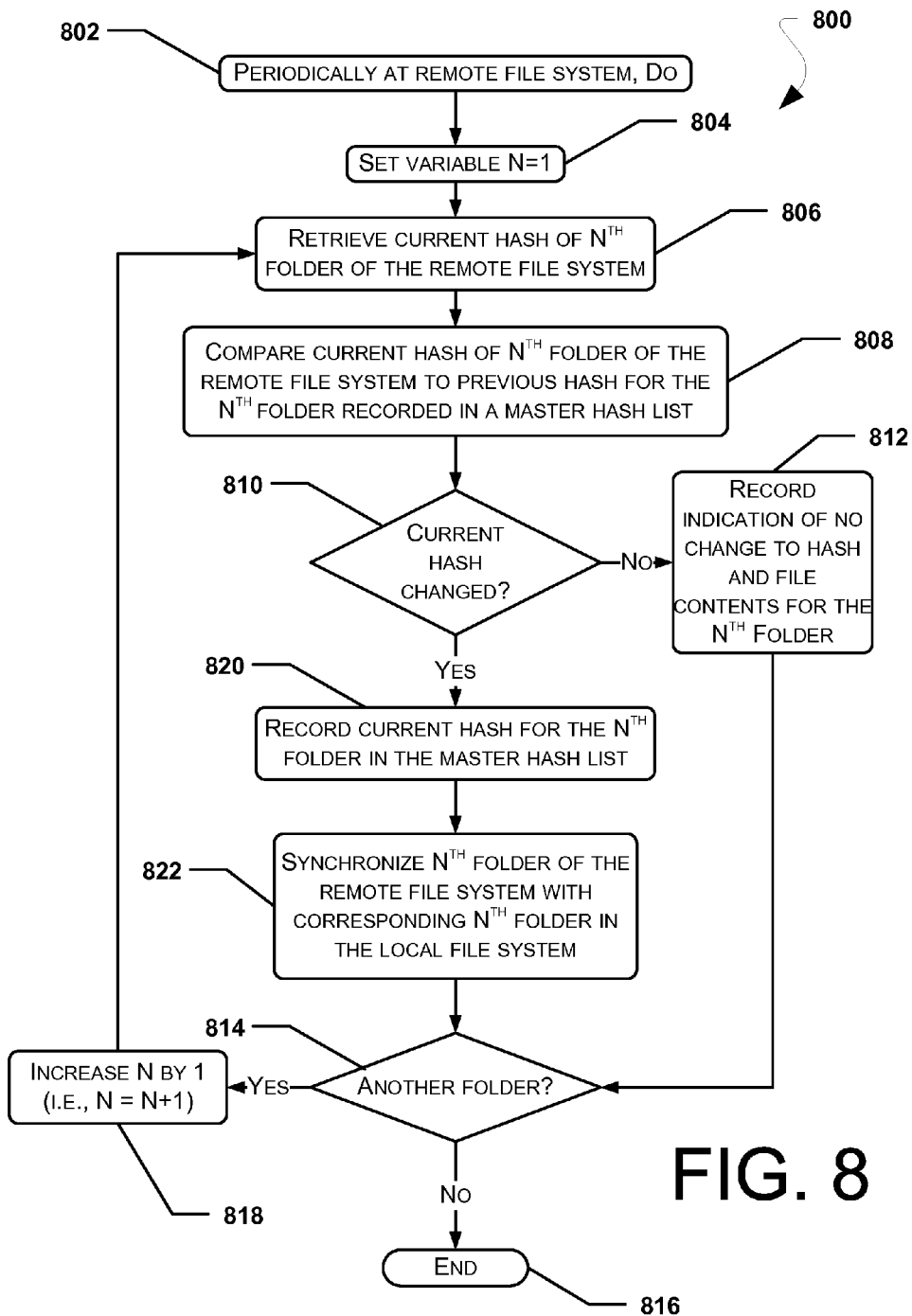
FIG. 8 illustrates a flow diagram of an example process for synchronizing files from a remote file system.
Figure 9:
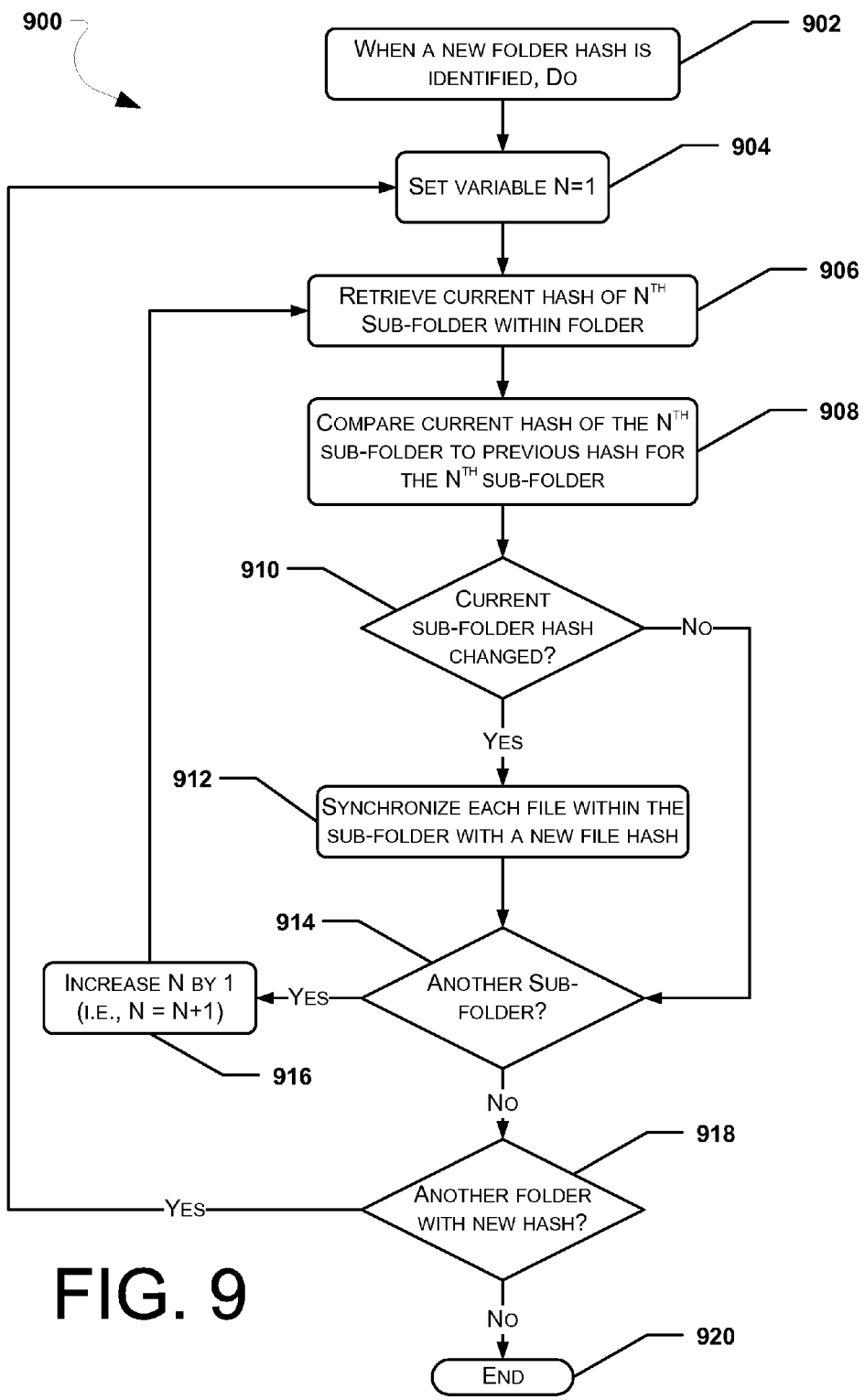
FIG. 9 illustrates a flow diagram of an example process for traversing a folder tree and sub-folder tree to locate file changes for synchronization.

FIG. 7 illustrates a flow diagram of an example process for synchronizing files from a local file system. FIG. 8 illustrates a flow diagram of an example process for synchronizing files from a remote file system. Moreover, FIG. 9 illustrates a flow diagram of an example process for traversing a folder tree and sub-folder tree to locate file changes for synchronization.

The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The description of the various processes may include certain transitional language and directional language, such as "then," "next," "thereafter," "subsequently," "returning to," "continuing to," "proceeding to," etc. These words, and other similar words, are simply intended to guide the reader through the graphical illustrations of the processes and are not intended to limit the order in which the process steps depicted in the illustrations may be performed.

Additionally, one or more of the various process steps depicted in FIGS. 4 through 9 may be performed by the one or more of the distributed computing resources 104, 106, 108 (FIG. 1) or the client computing devices 130, 132, 134 (FIG. 1) in order to synchronize shared folders and files stored therein or in a memory device accessible thereto. In particular, one or more of the various process steps depicted in FIGS. 4 through 9 may be performed by the remote shared folder and file synchronization module 120 (FIG. 1) within the distributed computing resources 104, 106, 108 (FIG. 1), the local shared folder and file synchronization module 150 (FIG. 1) within the client computing device 130, 132, 134 (FIG. 1), or a combination thereof.

As stated above, FIG. 4 illustrates a flow diagram of an example process, designated 400, to upload files and a master hash list to a remote file system from a local file system. Beginning at 402, the process 400 includes setting a variable N=1. The variable N can be an integer that will serve as a counter to allow the process to traverse individual files one at a time without repeating any files. At 404, the process 400 can include computing a folder hash for the Nth folder within the local file system. The folder hash for the Nth folder can be computed, or otherwise determined, based on the hash table used to map the data associated with the Nth folder to the memory, or computer-readable media, on which the local file system is stored. The folder hash for the Nth folder is based on the sub-folder hash for each sub-folder therein, the file hash for each file within the Nth folder, and the file hash for each file within the sub-folder within the Nth folder. In a particular aspect, the process 400 can leverage the data model used to store and retrieve data associated with the files. The process 400 can utilize a remote procedure call (RPC) to retrieve the folder hash from the hash table associated with the data within the file system. Specifically, the process 400 can utilize a GetRootFolder RPC, or a modified version of the GetRootFolder RPC, in order to retrieve the folder hash from the hash table.

At 406, the process 400 can include computing, or otherwise determining, a sub-folder hash for each sub-folder within the Nth folder within the local file system. The hash for each sub-folder within the Nth folder can be computed based on the hash table used to map the data associated with each sub-folder within the Nth folder to the memory, or computer-readable media, on which the local file system is stored. The hash for each sub-folder within the Nth folder is based on the hash for each file within the sub-folder within the Nth folder. Moreover, in a particular aspect, the process 400 can utilize a remote procedure call (RPC) to retrieve the sub-folder hash from the hash table associated with the data within the file system. Specifically, the process can 400 utilize a GetRootFolder RPC, or a modified version of the GetRootFolder RPC, in order to retrieve the sub-folder hash from the hash table.

Moving to 408, the process 400 can include computing a file hash for each file within the Nth folder. This includes each file within each sub-folder within the Nth folder. The hash for each file within the Nth folder can be computed based on the hash table used to map the data associated with each file within the Nth folder to the memory, or computer-readable media, on which the local file system is stored. Moreover, in a particular aspect, the process 400 can utilize a remote procedure call (RPC) to retrieve the file hash for each file from the hash table associated with the data within the file system. Specifically, the process can 400 utilize a GetRootFolder RPC, or a modified version of the GetRootFolder RPC, in order to retrieve the file hash for each file from the hash table.

Continuing to 410, the process 400 can include recording the folder hash, the sub-folder hashes, and the file hashes for the Nth folder on the local file system. The folder hash, the sub-folder hashes, and the file hashes for the Nth folder can be recorded and associated with an identifier for the Nth folder, the identifier for each sub-folder within the Nth folder, and the identifier for each file within the Nth folder. Each identifier can be a name, title, or some other description, associated with the Nth folder, each sub-folder, and each file. At 412, the process 400 includes determining whether there is another folder in the file system.

If there is another folder in the file system, the process 400 can proceed to 414 and the process 400 can include increasing the value of N by one (1). In other words, the value of N can be recomputed by adding one (1) to the current value of N, i.e., N=N+1. Thereafter, the process 400 can return to 404 and the process 400 can perform steps 404 through 410 as described herein. At 412, if the process 400 determines that there are no remaining folders, the process 400 may proceed to 416.

At 416, the process 400 can include aggregating the hash values retrieved above into a single master hash report or a single master hash list. The master hash list can include the folder hash for each folder, the sub-folder hash for each sub-folder within each folder, and the file hash for each file within each sub-folder and folder. The master hash list can be compiled as a table and can include a time/date stamp and an identifier of the client computing device associated with local file system. At 418, the process 400 can include transmitting the folders and the contents of the folders, e.g., the sub-folders and files therein, to a remote file system. For example, the folders and contents therein can be uploaded to a remote file system of a distributed computing resource via a network connection. Thereafter, the process 400 may end at 420.

FIG. 5 and FIG. 6 illustrate a flow diagram of an example process 500 for synchronizing shared folders and files. Beginning at 502, the process 500 can include periodically polling, or otherwise determining, the state of the remote file system wherein the remote instances of shared folders, shared sub-folders, shared files, shared sub-level files, and/ or shared shortcuts are stored.

The remote file system state can include a plurality of remote folder hash values. The plurality of remote folder hash values can be determined at least partially based on a plurality of sub-folder hashes associated with a plurality of remote instances of shared sub-folders, a plurality of file hashes associated with a plurality of remote instances of shared files, a plurality of sub-file hashes associated with a plurality of remote instances of shared sub-files, a plurality of shortcut hashes associated with a plurality of remote instances of shared shortcuts, or combination thereof at the remote file system.

Further, the state of the remote file system can be organized as a master hash list or a current remote file system hash list. The polling can be initiated by a shared folder and file synchronization module at the remote file system and the results can be transmitted to the shared folder and file synchronization module at the local file system. Conversely, the shared folder and file synchronization module at the local file system can transmit a request to the shared folder and file synchronization module at the remote file system for a current state of the hashes associated with the shared folders and files at the remote file system. In response to this request, the shared folder and file synchronization module at the remote file system can poll the state of the hashes of the shared folders and files and transmit the results of the poll to the shared folder and file synchronization module at the local file system. The shared folder and file synchronization module at the local file system can receive the current state of the hashes associated with the shared folders and file at the remote file system, e.g., as a master hash list.

At 504, the process 500 can include comparing the current state of the remote file system to the resources available at the local file system or the state of the local file system determined by the synchronization module at the local file system. The local file system state can include a plurality of local folder hash values within the local file system. The plurality of local folder hash values can be determined at least partially based on a plurality of sub-folder hashes associated with a plurality of local instances of shared sub-folders, a plurality of file hashes associated with a plurality of local instances of shared files, a plurality of sub-file hashes associated with a plurality of local instances of shared sub-files, a plurality of shortcut hashes associated with a plurality of local instances of shared shortcuts, or combination thereof at the local file system.

The process 500 can compare the remote file system state and the local file system state to determine any differences in the plurality of remote folder hash values within the remote file system state and the plurality of local folder hash values within local file system state. Any shared folder in which the remote folder hash value is different from the local folder hash value can be synchronized across the local file system and the remote file system as described herein.

Specifically, the shared folder and file synchronization module at the local file system can conduct a poll of the hashes associated with the local version of the shared folders and files to get a current local hash list. The current remote hash list, e.g., the master hash list, can be compared to the previous master hash list. The current local hash list can also be compared to the most recent previously recorded local hash list. Further, the current local hash list can be compared to the current master hash list to determine any differences between the hashes in the current local hash list and the hashes in the current master hash list.

In a particular aspect, the process 500 can include determining whether a particular shared file includes an inconsistent file hash pairing. The inconsistent file hash pairing can include a local file hash for a local instance of the particular shared file that is different from a remote file hash for a remote instance of the particular shared file. Further, the process 500 can include synchronizing the particular shared file with the inconsistent file hash pairing as described below. In another aspect the inconsistent file hash pairing can include a missing local file hash for a local instance of the particular shared file or a missing a remote file hash for a remote instance of the particular shared file. In such a case, the process 500 can include deleting the local instance of the particular shared file from the local file system or deleting the remote instance of the particular shared file from the remote file system.

Moving to 506, the process 500 can include determining whether any files have been changed locally. Based on the comparisons performed above, any differences between the current local hash list and the most recent previously recorded local hash list can indicate that a file has been changed by a user locally. Moreover, any differences between the current local hash list and the current master hast list can indicate that files have been changed, either remotely or locally. A time stamp associated with each file can indicate the most recent version. A local file with the most recent time stamp can be considered as having been changed locally.

In particular, the process 500 can include determining a time stamp for a local instance of a particular shared file, determining a time stamp for a remote instance of the particular shared file, and synchronizing the particular shared file to the most recent of the local instance of the particular shared file and the remote instance of the particular shared file. For example, the process 500 can include uploading the local instance of the particular shared file to the remote file system or downloading the remote instance of the particular shared file to the local file system.

At 506, if any files have been changed locally, the process 500 can proceed to 508 and the process 500 can further include uploading the files to the remote file system. In one aspect, the entire file that has been changed can be uploaded to the remote file system. In another aspect, to save upload time and storage, the shared folder and file synchronization system can parse the changes from the file and upload only the changes to the remote file system. After upload, the shared folder and file synchronization system can update the file with the changes at the remote file system. Thereafter, the process 500 can move to 510. Returning to 506, if there are not any files that have been changed locally, the process 500 can move directly to 510.

At 510, the process 500 can include determining whether any folders, sub-folders, files, or a combination thereof have been deleted in the remote file system. Based on the comparison of the most recent master hash list and the current master hash list, the system can determine whether any folder hashes, sub-folder hashes, or file hashes are missing from the current master hash list. If so, those folders, sub-folders, files, sub-level files, or shortcuts corresponding to the missing hashes in the current master hash list, are considered to have been deleted from the remote file system. If there are folders, sub-folders, files, sub-level files, or shortcuts that are deleted from the remote file system, the process 500 can move to 512. At 512, the process 500 can include deleting the corresponding folder, sub-folder, file, sub-level file, or shortcut from the local file system. In a particular aspect, the folder, sub-folder, file, sub-level file, or shortcut may be deleted immediately. In another aspect, a delayed delete may be used and the folder, sub-folder, file, sub-level file, or shortcut can be placed in a delete folder, or cache, for a predetermined time period. After the predetermined time period expires, the folder, sub-folder, file, sub-level file, or shortcut can be permanently deleted. The delete folder, or cache, may be encrypted or unencrypted. Further, the delete folder, or cache, may be hidden or not hidden from the user.

Thereafter, the process 500 can continue to 514. Returning to 510, if there are not any folders, sub-folders, files, sub-level files, or shortcuts deleted from the remote file system, the process 500 can move directly to 514.

At 514, the process 500 can include determining whether any folders, sub-folders, files, or a combination thereof have been deleted in the local file system. Based on the comparison of the most recently recorded previous local hash list and the current local hash list, the system can determine whether any folder hashes, sub-folder hashes, or file hashes are missing from the current local hash list. If so, those folders, sub-folders, files, sub-level files, or shortcuts corresponding to the missing hashes in the current local hash list, are considered to have been deleted from the local file system. If there are folders, sub-folders, files, sub-level files, or shortcuts that are deleted from the local file system, the process 500 can move to 516. At 516, the process 500 can include deleting the corresponding folder, sub-folder, file, sub-level file, or shortcut from the remote file system. Thereafter, the process 500 can continue to 602 of FIG. 6. Returning to 514, if there are not any folders, sub-folders, files, sub-level files, or shortcuts deleted from the local file system, the process 500 can move directly to 602 of FIG. 6.

At 602, the process 500 can include determining whether any files have been updated, or otherwise changed remotely. Further, the process 500 can include determining whether any new files have been added to the remote file system. Based on the comparisons performed above, any differences within the current remote hash data, when compared to the most recent master list at the local file system, can indicate that a file has been changed by a user at another client computing device (e.g., another local file system) and those changes have been changed at the remote file system, but not yet propagated throughout all client computing devices having access to the remote file system—including the current local file system. Further, any differences between the current local hash list and the current master hash list can indicate that files have been changed, either remotely or locally. A time stamp associated with each file can indicate the most recent version. A remote file with the most recent time stamp can be considered as having been changed remotely. If there are new folder hashes, sub-folder hashes, or file hashes within the master file list, the corresponding folders, sub-folders, files, sub-level files, or shortcuts will be considered to be new.

At 602, if any files have been updated remotely, or there are new files that are stored remotely, the process 500 can proceed to 604 and the process 500 can further include downloading the updated files and new files from the remote file system to the local file system. In one aspect, the entire file that has been updated, or otherwise changed, can be downloaded to the local file system. In another aspect, to save download time and storage, the shared folder and file synchronization system can parse the updates, or changes, from the file and download only the updates, or changes, to the local file system. After the download is complete, the shared folder and file synchronization system can update the file with the updates, or changes, at the local file system. Thereafter, the process 500 can move to 606. Returning to 602, if there are not any files that have been updated remotely, or there are not any new files at the remote file system, the process 500 can move directly to 606.

At 606, the process 500 can include determining whether access permission for any of the shared folders, sub-folders, files, sub-level files, or shortcuts is changed for any local users. If not, the process 500 can end at 608. On the other hand, if access permission is changed for any local users, the process 500 moves to 610 where the process 500 can include determining whether access to a particular shared folder, sub-folder, file, sub-level file, or shortcut for a particular local user is granted or denied. If access to a particular shared folder, sub-folder, file, sub-level file, or shortcut is denied to a particular local user, the process 500 moves to 612 and the process 500 can include deleting the particular folder, sub-folder, file, sub-level file, or shortcut from the local file system associated with the local user that is denied access to the particular folder, sub-folder, file, sub-level file, or shortcut. Thereafter, the process 500 can end at 608.

Returning to 610, if access to a particular shared folder, sub-folder, file, sub-level file, or shortcut is granted to a particular local user, the process 500 moves to 614 and the process 500 can include downloading the particular folder, sub-folder, file, sub-level file, or shortcut from the remote file system to the local file system associated with the local user that is granted access to the particular folder, sub-folder, file, sub-level file, or shortcut. Thereafter, the process 500 can end at 608.

Referring now to FIG. 7, a flow diagram of an example process for synchronizing files from a local file system is illustrated and is generally designated 700. Commencing at 702, the process 700 can include entering a do loop, wherein periodically, the following steps are performed. For example, at 704, the process 700 can include setting a variable N equal to one (1). The variable N can be an integer that serves as a counter to allow the shared folder and file synchronization system to traverse individual folders one at a time without repeating any folders. At 706, the process 700 can include retrieving a current hash of the Nth folder of the local file system. The current hash for the Nth folder can be retrieved from a hash table associated with the local file system that is used to map the memory locations of the data stored within the local file system. In particular, the current hash for the Nth folder can be retrieved from the local file system hash table using a GetRootFolder RPC. In another aspect, the process 700 can recompute the current hash for the Nth folder based on the sub-folder hashes, file hashes, sub-level file hashes, and/or shortcut hashes associated with any sub-folders, files, sub-level files, and/or shortcuts stored within the Nth folder. The process 700 can recompute the current hash and use that value to verify the accuracy of the retrieved value. Or, in lieu of retrieving the current hash from a hash table, the process 700 can include recomputing the hash as described above.

After the current folder hash of the Nth folder of the local file system is retrieved, the process 700 can proceed to 708. At 708, the process 700 can include comparing the current folder hash of the Nth folder of the local file system to the previous hash for the Nth folder recorded in a master hash list. In a particular aspect, the comparison can include comparing the actual value of the folder hash of the Nth folder to the most recently recorded value of the folder hash for the Nth folder stored in the master hash list to determine if the current folder hash of the Nth folder is different from the most recently recorded value of the folder hash for the Nth folder.

At 710, the process 700 can include determining whether current folder hash of the Nth folder is different from the previously recorded folder hash for the Nth folder. In a particular aspect, the current folder hash of the Nth folder is dependent on the sub-folders within the Nth folder and the files within the Nth folder, e.g., any sub-folders within the Nth folder. If the content of any file within the Nth folder changes, the file hash of the file changes and the folder hash of the Nth folder also changes in response to the changing file hash. Moreover, if the content of any file within a sub-folder of the Nth folder changes, the file hash of the file changes and the sub-folder hash of the sub-folder changes. Also, the folder hash of the Nth folder changes. The new folder hash of the Nth folder can indicate that a file, or files, within the Nth folder have been changed and should be synchronized accordingly.

At 710, if the current folder hash of the Nth folder is not different from the previously recorded folder hash for the Nth folder, the process 700 can move to 712. At 712, the process 700 can include recording an indication that the folder hash for the Nth folder has not changed or is the same as the previously recorded folder hash for the Nth folder. Moreover, the process can include recording an indication that the contents of the Nth folder are the same as previously saved and have not been updated, changed, edited, or otherwise altered. The process 700 can record the indication of the folder hash of the Nth folder and contents of the Nth folder not changing in a file for tracking changes to the shared folders and files.

Continuing to 714, the process 700 can include determining whether there is another folder in the local file system. If not, the process 700 can end at 716. Otherwise, if there is another folder in the local file system, the process 700 can proceed to 718. At 718, the process 700 can include increasing the value of N by one (1). In other words, the value of N can be recomputed by adding one (1) to the current value of N, i.e., N=N+1. Thereafter, the process 700 can return to 706 and the process 700 can continue as described above for the next folder in the local file system.

Returning to 710, if the current folder hash of the Nth folder is different from the previously recorded folder hash for the Nth folder, the process 700 can move to 720. At 720, the process 700 can include recording the current folder hash for the Nth folder in the master hash list. Particularly, the process 700 can overwrite the entry within the master hash list for the previous folder hash value for the Nth folder with the current folder hash value for the Nth folder. The previous hash value for the Nth folder can be recorded in a tracking file prior to being overwritten. Otherwise, the previous hash value can be discarded.

Moving to 722, the process 700 can including synchronizing the Nth folder of the local file system with the corresponding Nth folder in the remote file system. In particular, once the files that have changed within the Nth folder of the local file system are synchronized with the corresponding instances of those files in the remote file system. The process 700 can quickly locate and determine which files have been updated, or otherwise changed, by traversing the folder tree and sub-folder tree associated with the Nth folder of the local file system to determine which sub-folder hashes and file hashes have changed.

In particular, the process for traversing a folder tree and sub-folder tree to locate file changes for synchronization that is described below in conjunction with FIG. 9 may be used by the shared folder and file synchronization system to quickly ascertain which folders, sub-folders, files, or portions thereof within the local file system are due for synchronization with the remote file system. Once the files that have been changed or updated are located, those files are synchronized in the remote file system.

Thereafter, the process 700 may continue to 714 and the process 700 can include determining whether the local file system includes another folder. If not, the process 700 can end at 716. Otherwise, the process 700 can move to 718 and continue as described above.

FIG. 8 illustrates a flow diagram of an example process for synchronizing files from a remote file system that is generally designated 800. Commencing at 802, the process 800 can include entering a do loop, wherein periodically, the following steps are performed. For example, at 804, the process 800 can include setting a variable N equal to one (1). The variable N can be an integer that serves as a counter to allow the shared folder and file synchronization system to traverse individual folders one at a time without repeating any folders. At 806, the process 800 can include retrieving a current hash of the Nth folder of the remote file system. The current hash for the Nth folder can be retrieved from a hash table associated with the remote file system that is used to map the memory locations of the data stored within the remote file system. In particular, the current hash for the Nth folder can be retrieved from the remote file system hash table using a GetRootFolder RPC.

In another aspect, the process 800 can include recomputing the current hash for the Nth folder based on the sub-folder hashes, file hashes, sub-level file hashes, and/or shortcut hashes associated with any sub-folders, files, sub-level files, and/or shortcuts stored within the Nth folder. The process 800 can recompute the current hash and use that value to verify the accuracy of the retrieved value. Or, in lieu of retrieving the current hash from a hash table, the process 800 can include recomputing the hash as described above.

After the current folder hash of the Nth folder of the remote file system is retrieved, the process 800 can proceed to 808. At 808, the process 800 can include comparing the current folder hash of Nth folder of the remote file system to the previous hash for the Nth folder recorded in a master hash list. In a particular aspect, the comparison can include comparing the actual value of the folder hash of the Nth folder to the most recently recorded value of the folder hash for the Nth folder stored in the master hash list to determine if the current folder hash of the Nth folder is different from the most recently recorded value of the folder hash for the Nth folder.

At 810, the process 800 can include determining whether current folder hash of the Nth folder is different from the previously recorded folder hash for the Nth folder. In a particular aspect, the current folder hash of the Nth folder is dependent on the sub-folders within the Nth folder and the files within the Nth folder, e.g., any sub-folders within the Nth folder. If the content of any file within the Nth folder changes, the file hash of the file changes and the folder hash of the Nth folder also changes in response to the changing file hash. Moreover, if the content of any file within a sub-folder of the Nth folder changes, the file hash of the file changes and the sub-folder hash of the sub-folder changes. Also, the folder hash of the Nth folder changes. The new folder hash of the Nth folder can indicate that a file, or files, within the Nth folder have been changed and should be synchronized accordingly.

At 810, if the current folder hash of the Nth folder is not different from the previously recorded folder hash for the Nth folder, the process 800 can move to 812. At 812, the process 800 can include recording an indication that the folder hash for the Nth folder has not changed or is the same as the previously recorded folder hash for the Nth folder. Moreover, the process can include recording an indication that the contents of the Nth folder are the same as previously saved and have not been updated, changed, edited, or otherwise altered. The process 800 can record the indication of the folder hash of the Nth folder and contents of the Nth folder not changing in a file for tracking changes to the shared folders and files.

Continuing to 814, the process 800 can include determining whether there is another folder in the remote file system. If not, the process 800 can end at 816. Otherwise, if there is another folder in the remote file system, the process 800 can proceed to 818. At 818, the process 800 can include increasing the value of N by one (1). In other words, the value of N can be recomputed by adding one (1) to the current value of N, i.e., N=N+1. Thereafter, the process 800 can return to 806 and the process 800 can continue as described above for the next folder in the remote file system.

Returning to 810, if the current folder hash of the Nth folder is different from the previously recorded folder hash for the Nth folder, the process 800 can move to 820. At 820, the process 800 can include recording the current folder hash for the Nth folder in the master hash list. Particularly, the process 800 can overwrite the entry within the master hash list for the previous folder hash value for the Nth folder with the current folder hash value for the Nth folder. The previous hash value for the Nth folder can be recorded in a tracking file prior to being overwritten. Otherwise, the previous hash value can be discarded.

Moving to 822, the process 800 can including synchronizing the Nth folder of the remote file system with the corresponding Nth folder in each local file system associated with the particular shared folder and file synchronization system having access to the remote file system and the folders and files therein. In particular, once the files that have changed within the Nth folder of the remote file system are synchronized with the corresponding instances of those files in the local file system. The process 800 can quickly locate and determine which files have been updated, or otherwise changed, by traversing the folder tree and sub-folder tree associated with the Nth folder of the remote file system to determine which sub-folder hashes and file hashes have changed.

In particular, the process for traversing a folder tree and sub-folder tree to locate file changes for synchronization that is described below in conjunction with FIG. 9 may be used by the shared folder and file synchronization system to quickly ascertain which folders, sub-folders, files, or portions thereof within the remote file system are due for synchronization with the local file system. Once the files that have been changed or updated are located, those files are synchronized in the local file system.

Referring now to FIG. 9, a flow diagram of an example process for traversing a folder tree and sub-folder tree to locate file changes for synchronization is illustrated and is designated 900. As shown in FIG. 9, the process 900 can begin at 902 with a do loop in which when a new folder has is identified, one or more of the following steps can be performed. For example, at 904, the process 900 can include setting a variable N equal to one (1). The variable N can be an integer that serves as a counter to allow the shared folder and file synchronization system to traverse individual sub-folders one at a time without repeating any sub-folders.

At 906, the process 900 can include retrieving a current hash of the Nth sub-folder within the folder that is identified as having a new folder hash. The current sub-folder hash for the Nth sub-folder can be retrieved from a hash table associated with the file system, local or remote, that is used to map the memory locations of the data stored within the particular file system. In one aspect, the current hash for the Nth sub-folder can be retrieved from the particular file system hash table using a GetRootFolder RPC.

After the current sub-folder hash of the Nth sub-folder of the file system is retrieved, the process 900 can proceed to 908. At 908, the process 900 can include comparing the current sub-folder hash of the Nth sub-folder of the file system to the previous sub-folder hash for the Nth sub-folder recorded in a master hash list, a current local hash list, a current remote hash list, or a combination thereof. In a particular aspect, the comparison can include comparing the actual value of the sub-folder hash of the Nth sub-folder to the most recently recorded value of the sub-folder hash for the Nth sub-folder stored in the particular hash list to determine if the current sub-folder hash of the Nth sub-folder is different from the most recently recorded value of the sub-folder hash for the Nth sub-folder.

At 910, the process 900 can include determining whether current sub-folder hash of the Nth sub-folder is different from the previously recorded sub-folder hash for the Nth sub-folder. In a particular aspect, the current sub-folder hash of the Nth sub-folder is dependent on the files within the Nth sub-folder. If the content of any file within the Nth sub-folder changes, the file hash of the file changes and the sub-folder hash of the Nth sub-folder also changes. The new sub-folder hash of the Nth sub-folder can indicate that a file, or files, within the Nth sub-folder have been changed and should be synchronized accordingly.

At 910, if the current sub-folder hash of the Nth sub-folder is not different from the previously recorded sub-folder hash for the Nth sub-folder, the process 900 can move to 912. At 912, the process 900 can include synchronizing each file within the sub-folder that has a new file hash. Thereafter, the process 900 can move to 914 where the process can include determining whether there is another sub-folder in the folder identified with a new folder hash. If there is another sub-folder, the process 900 can move to 916. At 916, the process 900 can include increasing the value of N by one (1). In other words, the value of N can be recomputed by adding one (1) to the current value of N, i.e., N=N+1. Thereafter, the process 900 can return to 906 and the process 900 can continue as described above for the next sub-folder in the folder identified as having a new folder hash within the file system.

Returning to 914, if there is not another sub-folder with the particular folder identified as having a new folder hash, the process 900 can continue to 918. At 918, the process 900 can include determining whether the file system includes another folder that includes a new hash. If the file system does include another folder having a new hash, the process 900 can return to 904 and can continue as described herein. Otherwise, at 918, if the file system does not have another folder with a new hash, the process 900 can end at 920.

FIG. 9 illustrates an example process 900 for traversing folder trees and sub-trees one at a time, i.e., in series as N increases from 1 to a final value of N. It can be appreciated with modern computing systems that utilize multiple processors, multi-core processors, multi-thread processing, interleaved multi-thread processing, shared processing, or any combination thereof, multiple folder trees and sub-trees may be traversed at the same time, or substantially the same time, in parallel with each other.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which may represent one or more operations that may be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described processes. The described processes, or portions thereof, may be performed by resources associated with one or more device(s) 104, 106, 108, 130, 132, 134 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   determining, by one or more processors of a computing device, one or more remote folder hash values that identify a remote file system state of a remote file system, wherein at least one remote folder hash value of the one or more remote folder hash values are determined at least partially based on sub-folder hashes associated with remote instances of shared sub-folders, file hashes associated with remote instances of shared files, sub-file hashes associated with remote instances of shared sub-files, shortcut hashes associated with remote instances of shared shortcuts, or a combination thereof at the remote file system;
   determining, by the one or more processors, one or more local folder hash values that identify a local file system state, wherein at least one local folder hash value of the one or more local folder hash values are determined at least partially based on sub-folder hashes associated with local instances of shared sub-folders, file hashes associated with local instances of shared files, sub-file hashes associated with local instances of shared sub-files, shortcut hashes associated with local instances of shared shortcuts, or a combination thereof at the local file system;
   comparing, by the one or more processors, the one or more remote folder hash values and the one or more local folder hash values to determine any differences in the remote file system state and the local file system state; and
   synchronizing, by the one or more processors, at least a portion of any shared folder, in which a remote folder hash value of the one or more remote folder hash values that corresponds to the shared folder is different from a local folder hash value of the one or more local folder hash values that corresponds to the shared folder, within the local file system and the remote file system.

2. The method of claim 1, wherein comparing the one or more remote folder hash values and the one or more local folder hash values comprises determining whether a particular shared file includes an inconsistent file hash pairing.

3. The method of claim 2, wherein the inconsistent file hash pairing includes a local file hash for a local instance of the particular shared file that is different from a remote file hash for a remote instance of the particular shared file.

4. The method of claim 2, further comprising:
   synchronizing the particular shared file with the inconsistent file hash pairing.

5. The method of claim 4, further comprising:
   determining a time stamp for the local instance of the particular shared file;
   determining a time stamp for the remote instance of the particular shared file; and
   synchronizing the particular shared file to the most recent of the local instance of the particular shared file and the remote instance of the particular shared file.

6. The method of claim 5, further comprising:
uploading the local instance of the particular shared file to the remote file system.

7. The method of claim 5, further comprising:
downloading the remote instance of the particular shared file to the local file system.

8. The method of claim 2, wherein the inconsistent file hash pairing includes a missing local file hash for a local instance of the particular shared file or a missing remote file hash for a remote instance of the particular shared file.

9. The method of claim 8, further comprising:
deleting the local instance of the particular shared file from the local file system.

10. The method of claim 8, further comprising:
deleting the remote instance of the particular shared file from the remote file system.

11. A method comprising:
determining, by one or more processors of a computing device, one or more remote folder hash values that identify a remote file system state, wherein at least one remote folder hash value of the one or more remote folder hash values are determined at least partially based on sub-folder hashes associated with remote instances of shared sub-folders, sub-file hashes associated with remote instances of shared sub-files, shortcut hashes associated with remote instances of shared shortcuts, or a combination thereof at the remote file system;
determining, by the one or more processors, one or more local folder hash values that identify a local file system state, wherein at least one local folder hash value of the one or more local folder hash values are determined at least partially based on sub-folder hashes associated with local instances of shared sub-folders, sub-file hashes associated with local instances of shared sub-files, shortcut hashes associated with local instances of shared shortcuts, or a combination thereof at the local file system;
comparing, by the one or more processors, the one or more remote folder hash values and the one or more local folder hash values to determine whether a remote instance of a shared folder, a remote instance of shared sub-folder, or a remote instance of a shared file includes a remote file system attribute that is different from a local file system attribute of a corresponding local instance of the shared folder, a corresponding local instance of a shared sub-folder, or a corresponding local instance of the shared file; and
synchronizing, by the one or more processors, the shared folder, the shared sub-folder, or the shared file in which the remote file system attribute is different from the local file system attribute.

12. The method of claim 11, wherein the remote file system attribute includes a remote folder value assigned to the remote instance of the shared folder, a remote sub-folder value assigned to the remote instance of the shared sub-folder, or a remote file value assigned to the remote instance of the shared file.

13. The method of claim 12, wherein the remote folder value comprises a remote folder hash, the remote sub-folder value comprises a remote sub-folder hash, and the remote file value comprises a remote file hash.

14. The method of claim 13, wherein the remote folder hash, the remote sub-folder hash, and the remote file hash are determined based on a remote hash table for the remote file system.

15. The method of claim 11, wherein the local file system attribute includes a local folder value assigned to the local instance of the shared folder, a local sub-folder value assigned to the local instance of the shared sub-folder, or a local file value assigned to the local instance of the shared file.

16. The method of claim 15, wherein the local folder value comprises a local folder hash, the local sub-folder value comprises a local sub-folder hash, and the local file value comprises a local file hash.

17. The method of claim 16, wherein the local folder hash, the local sub-folder hash, and the local file hash are determined based on a local hash table for the local file system.

18. A shared folder and file synchronization system, comprising:
one or more computer-readable media having thereon a synchronization module and a file system;
a processing unit operably coupled to the computer-readable media, the processing unit adapted to execute the synchronization module, wherein the synchronization module is configured to:
determine one or more remote folder hash values associated with a remote instance of a shared data structure within a remote file system, wherein at least one remote folder hash value of the one or more remote folder hash values are determined at least partially based on sub-folder hashes associated with remote instances of shared sub-folders, sub-file hashes associated with remote instances of shared sub-files, shortcut hashes associated with remote instances of shared shortcuts, or a combination thereof at the remote file system;
determine one or more local folder hash values associated with a local instance of a shared data structure within a local file system, wherein at least one local folder hash value of the one or more local folder hash values are determined at least partially based on sub-folder hashes associated with local instances of shared sub-folders, sub-file hashes associated with local instances of shared sub-files, shortcut hashes associated with local instances of shared shortcuts, or a combination thereof at the local file system;
determine whether the one or more remote folder hash values are different from the one or more local folder hash values; and
selectively synchronize the remote instance of the shared data structure within the remote file system with the local instance of the shared data structure within the local file system so that content within the shared data structure is the same at the remote file system and the local file system.

19. The system of claim 18, wherein the shared data structure comprises a shared folder, a shared sub-folder, a shared file, or a combination thereof.

20. The system of claim 18, wherein the one or more remote folder hash values comprise one or more of a remote folder hash, a remote sub-folder hash, or a remote file hash retrieved from a remote hash table associated with the remote file system and wherein the one or more local folder hash values comprise one or more of a local folder hash, a local sub-folder hash, or a local file hash retrieved from a local hash table associated with the local file system.

* * * * *